United States Patent [19]

Wood et al.

[11] 3,852,751
[45] Dec. 3, 1974

[54] DATA HANDLING RECEIVER AND PHASE TRACKING

[75] Inventors: Robert L. Wood, South Gate; Lyle R. Frederickson, Placentia, both of Calif.

[73] Assignee: Rockwell International Corporation, El Segundo, Calif.

[22] Filed: Dec. 21, 1972

[21] Appl. No.: 317,440

[52] U.S. Cl............................................. 343/105 R
[51] Int. Cl.............................................. G01s 1/36
[58] Field of Search ................................. 343/105 R

[56] References Cited
UNITED STATES PATENTS 3,725,932  4/1973  Hughes ........................... 343/105 R
3,761,932  9/1973  Fujimoto ......................... 343/105 R Primary Examiner—T. H. Tubbesing
Assistant Examiner—Richard E. Berger
Attorney, Agent, or Firm—L. Lee Humphries; H. Fredrick Hamann; Rolf M. Pitts

[57] ABSTRACT

A receiver for use with the Omega world-wide navigational system employs pairs of digital phase lock loops, all referenced from a common multi-phase pulse train, for tracking the phase of transmitted Omega signals. Comparison of outputs from selected pairs of the tracking loops provides a non-ambiguous indication of phase difference of signals received from selected Omega stations. A semi-automatic start and synchronization of a commutator for the several phase lock loops is included.

21 Claims, 18 Drawing Figures

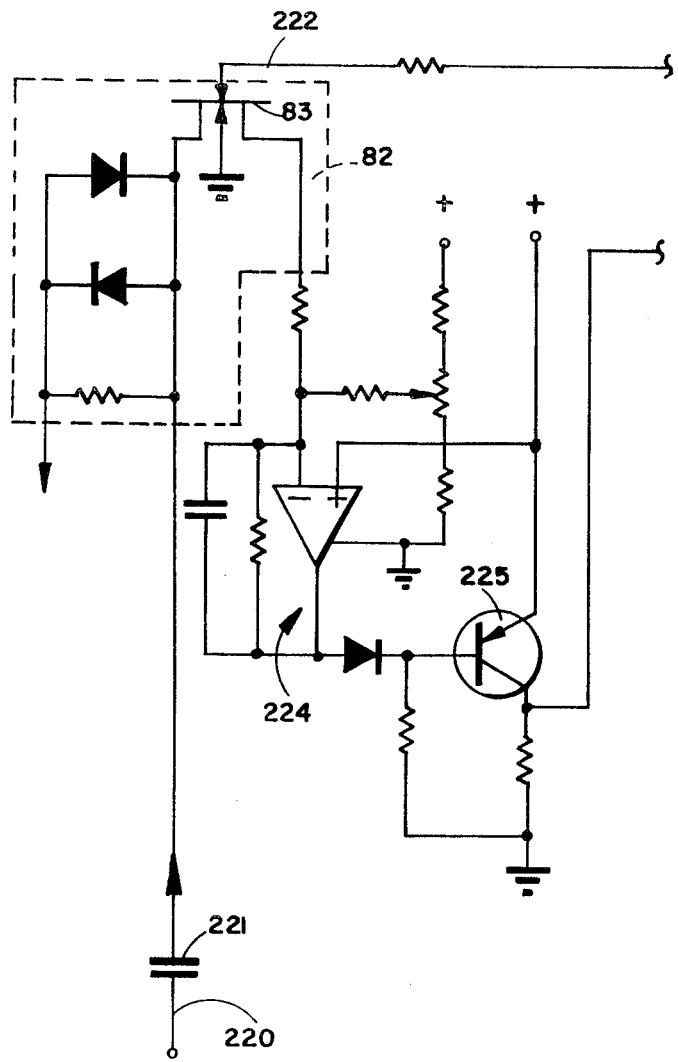
FIG. IIa

DATA HANDLING RECEIVER AND PHASE TRACKING

This application is related to the copending application of Robert L. Wood for Non-Ambiguous Phase Meter, Ser. No. 317,441, filed Dec. 21, 1972 (now abandoned).

BACKGROUND OF THE INVENTION

1. Field of the Invention

The present invention relates to navigation systems and more particularly concerns a phase tracking and phase comparison of signals transmitted from a number of spaced stations for determining position.

2. Description of Prior Art

The Omega navigation system employs a network of eight very low frequency radio stations to provide a world-wide electronic lattice within which position of an observer can theoretically be determined with a probable daytime error of ±1 nautical mile and ±2 nautical miles in nighttime. Although eight stations are comtemplated, the system is presently implemented with but four. The Omega stations are phase locked to a nearly absolute time standard and thus provide a signal field where the phase is everwhere stationary. Accordingly, at any point, the measured phase difference of a pair of signals transmitted from a particular pair of stations depends solely upon the relative distances of the observer from the two stations. Further, the same phase angle measurement will be observed at all points that have the same difference in distance from the two stations. The locus of such points is a contour of constant phase (an isophase contour) which is fixed on the surface of the earth with respect to the positions of the pair of transmitters. Because the relative phase of every pair of signals observed at any point on the earth defines a known isophase contour containing that point, the intersection of two such isophase contours established by different pairs of stations defines the location of the point.

The various Omega stations always transmit in the same order, that is, one station transmits after another, each always following the same station. Although each station transmits on several different frequencies, including 10.2 kHz, 11.33 kHz and 13.6 kHz, the present application will concern itself only with the basic 10.2 kHz transmission although, as will be readily appreciated, principles of the invention are applicable to the several Omega frequencies and other frequencies as well.

The length of each station transmission at 10.2 kHz, in seconds, according to the presently implemented Omega station identification code is as follows:

| Station | | |
|---|---|---|
| Station | A | 0.9 |
| do. | B | 1.0 |
| do. | C | 1.1 |
| do. | D | 1.2 |
| do. | E | 1.1 |
| do. | F | 0.9 |
| do. | G | 1.2 |
| do. | H | 1.0 |

There is an interval of 0.2 seconds between each transmission whereby one complete Omega cycle (the transmission from an entire group of eight stations) requires 10.0 seconds and each group of transmissions is repeated each 10 seconds.

The basic 10.2 kHz transmission generate hyperbolic lanes that are 8 nautical miles wide on a base line extending between a pair of stations. In order to initially position himself within this system, the navigator must know his position with ± 4 nautical miles. The Omega system is a lane counting system and once the lane count is established and the equipment is run continuously, no reference to other systems if necessary. In the event of equipment or transmitter failure, lane count will have to be re-established, but this type of outage is usually short-term in effect and no difficulty is encountered if adequate dead reckoning position is maintained.

The Omega station transmissions are precisely controlled continuous wave pulses of the previously identified duration. Each 10-second cycle of transmission from the entire group of stations is synchronized to universal time.

An article entitled "VLF Timing: Conventional and Modern Techniques Including Omega," by Swanson and Kugel, in the Proceedings of the IEEE Volumn 60, No. 5, May, 1972, Pages 540 through 551, describes very low frequency timing techniques in general and specifically describes aspects of the Omega System. Omega Tables, from which position is determined by use of measured phase differences, are published according to station pairs and areas by the U.S. Naval Oceanographic Office and include general information describing basic principles of Omega. An exemplary one of such publications is identified as H.O. Publication No. 224 (111) Pair A-C Omega Table North America, Area 11.

U.S. Pat. No. 3,388,397 to A. F. Thornhill et al., describes an omega receiver employing phase measuring servos that automatically operate to provide dead reckoning upon loss of received signal. The Thornhill system is one of several that are presently employed to determine phase relationship of the incoming Omega signal with respect to absolute time or in respect to another transmitted Omega signal. Such systems include mechanical servos, computers or digital to analog converters for phase determination. These methods are costly, complex and unreliable. They employ phase tracking arrangements that are subject to instabilities of various components and several suffer from instability of control signal for a voltage controlled oscillator. Further, many prior tracking systems employ an oscillator for each tracking loop, thus multiplying the problems of oscillator instability.

It is an object of the present invention to provide for phase measurement with a high reliability, high stability and minimum cost and, further, to provide a navigation receiver of improved capabilities.

SUMMARY OF THE INVENTION

In carrying out principles of the present invention in accordance with a preferred embodiment thereof, a receiver employs a number of phase tracking loops that are sequentially operated by a station commutator in synchronism with transmissions from selected Omega stations and provides phase comparison of selected ones of the transmissions. The receiver system employs a unique starting and synchronizing of the commutator and employs a unique phase tracking loop that is digitally locked in its phase. In another aspect of the invention, the digital phase tracking loop employs a multiphase reference signal and phase searching means for selecting reference components of mutually different phases in first and second sequences of mutually opposite sense. Phase of a selected component is compared with phase of an input signal and the sense of the sequential selection is controlled according to such comparison. Control of the rate of sequencing of the reference component selection controls the effective bandwidth and signal-to-noise ratio of the phase tracking loop.

The phase tracking loops eliminate instabilities of the oscillator phase control signal and require only a single reference for a number of loops.

BRIEF DESCRIPTION OF THE DRAWINGS

FIGS. 11a and 11b show circuitry of a digital phase lock loop.

DETAILED DESCRIPTION

Figure 1:
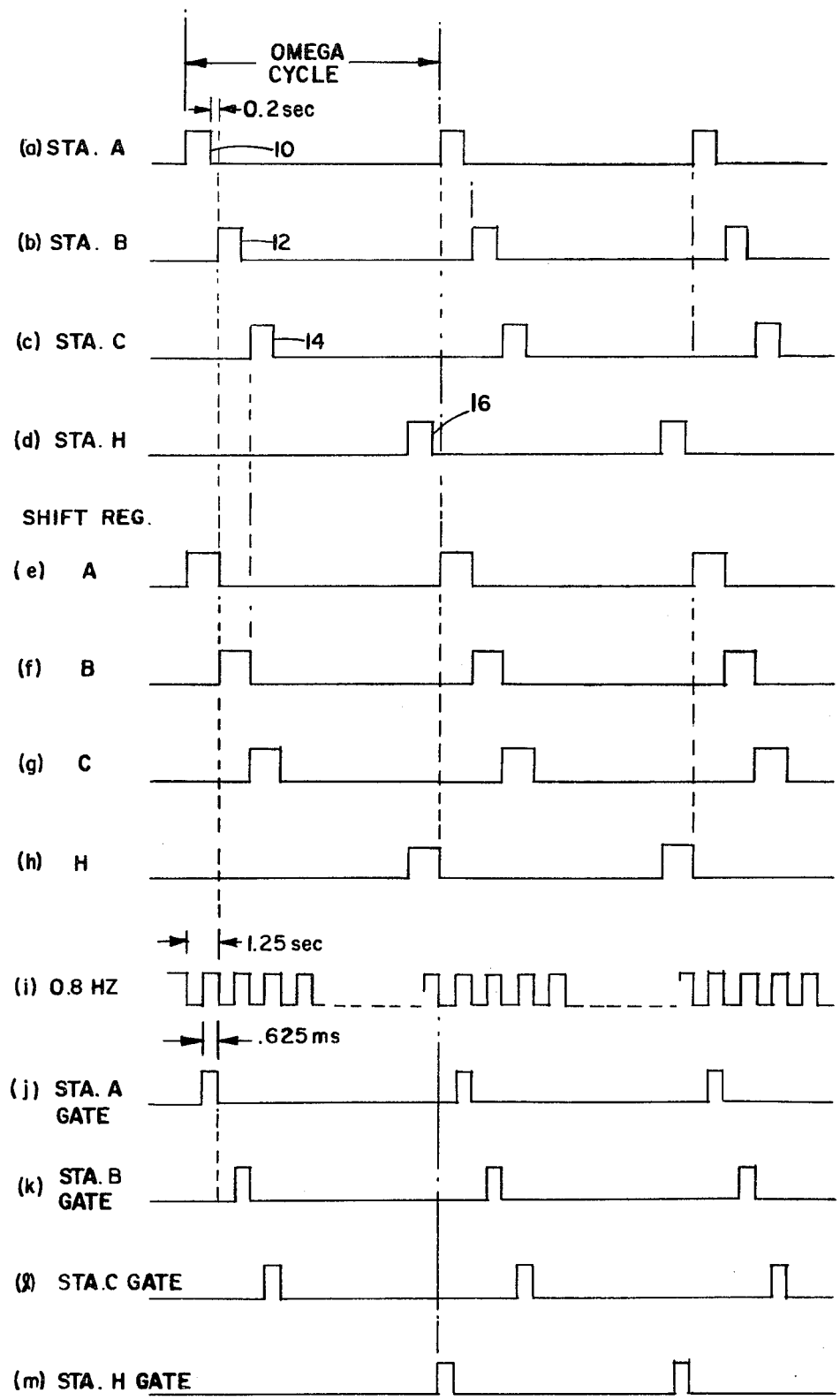
FIG. 1 is a synchrograph illustrating relative timing of Omega station transmissions, and of station commutator and gating of an embodiment of the present invention.

The Omega system comprises a group of eight stations, A, B, C, D, E, F, G and H, respectively, each of which transmits a repeated short pulse of a fixed frequency. Thus, station A, as shown in FIG. 1, transmits pulses indicated at 10, each of which is a short burst of a continuous precisely controlled frequency such as 10.2 kHz. Stations B, C, etc., through station H, similarly transmit pulses of 10.2 kHz frequencies indicated at 12, 14 and 16. Termination of transmission of station A is followed by 0.2 seconds dead time at the end of which time, transmission from station B commences. After a 0.2 second interval, transmission from station C commences, and so on until the termination of transmission from station H. Now, after the 0.2 second interval, station A again transmits and the next Omega cycle is repeated. Each complete Omega cycle is of a precise 10-second duration and is initiated at a known absolute time.

Figure 2:
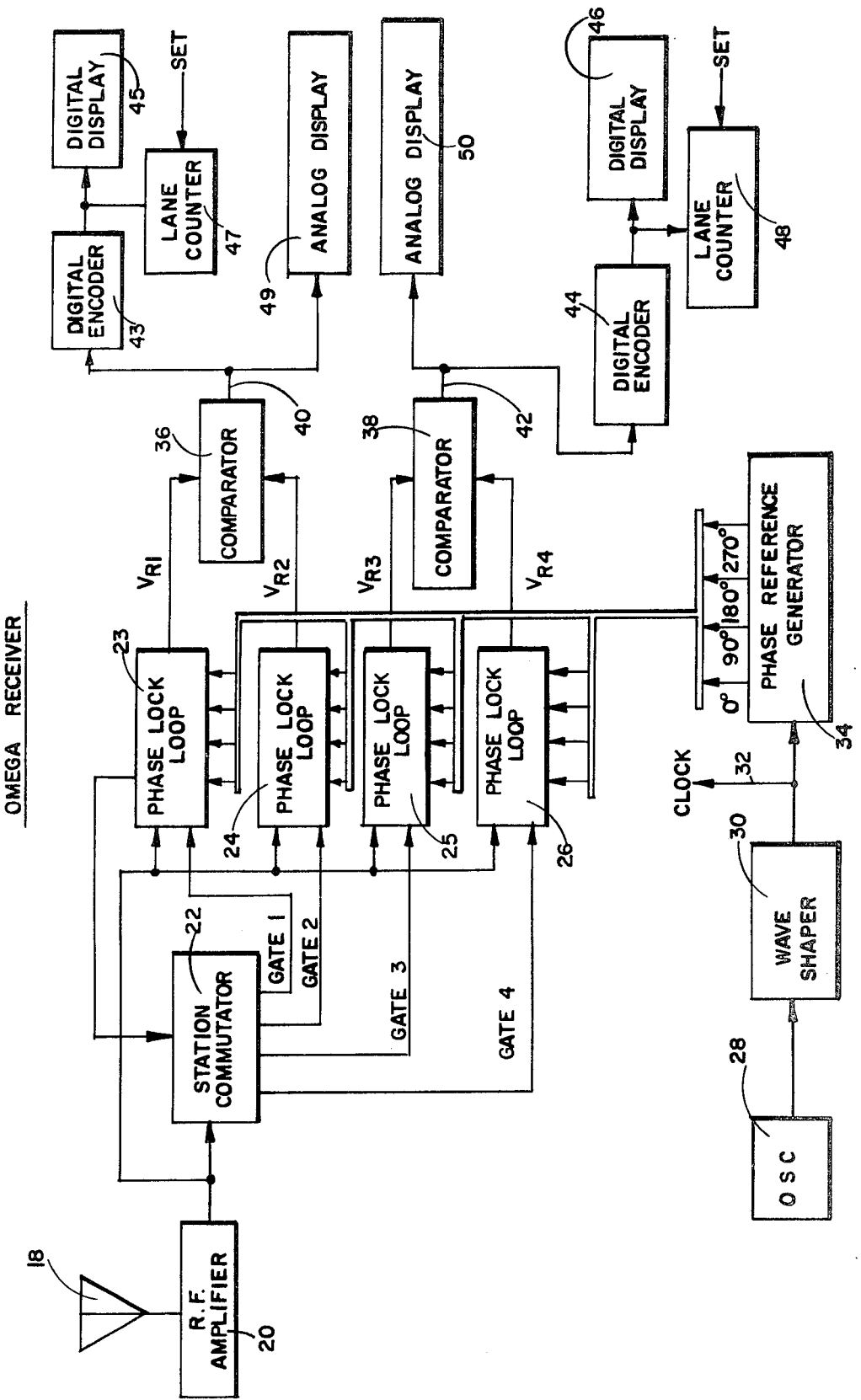
FIG. 2 is a block diagram illustrating the overall organization of the receiver.

The function of the navigation receiver is to select three or more of the transmitting Omega stations and to compare phases of two or more different pairs of station signals so as to provide two or more intersecting lines of position. As illustrated in FIG. 2, received Omega station signals are transmitted from an antenna 18 through an R. F. amplifier 20 to a station commutator 22 and to each of a group of phase lock loops 23, 24, 25 and 26. At least four phase lock loops (two pairs of loops) are required to obtain two lines of positions. Nevertheless, it will be readily appreciated that additional pairs of phase lock loops will provide additional lines of position to thus further increase accuracy of position measurement. Where additional phase lock loops are provided, they will each be identical to those to be described herein, and will be each operated in a similar manner.

The station commutator provides phase lock loop gate signals indicated at gate 1, gate 2, gate 3 and gate 4, for loops 23, 24, 25 and 26, respectively. The gate signals are synchronized with the sequence of Omega station transmissions so as to sequentially enable operation of the respective phase lock loops in synchronism with transmissions from selected stations. For example, if phase lock loops 23 and 24 are to track stations A and B, respectively, gates 1 and 2 will cause these loops to be activated only during transmissions of the respective stations A and B. Similarly, if phase lock loops 25 and 26 are to track stations F and G, respectively, gates 3 and 4 will be synchronized by the commutator so as to enable phase lock loops 25, 26 only at times during which the respective stations F and G are transmitting.

A crystal controlled oscillator 28 has a sinusoidal output fed through a wave shaper 30 to provide a system clock on line 32 and to provide a trigger for a multi-phase reference generator 34 that provides a plurality of like frequency but mutually phase displaced reference phase signal components, all of which are fed to all of the phase lock loops. Each of the phase lock loops provides an output signal at the Omega transmission frequency (10.2 kHz in a particular example) that is phase locked (in quadrature) to the transmission from the particular station that is assigned to it for a given measurement. These outputs are continuous and retained by a digital phase control of each of the phase lock loops so as to provide a highly stable phase of the respective outputs, indicated in FIG. 2 as $V_{R1}$, $V_{R2}$, $V_{R3}$, $V_{R4}$, respectively.

Outputs of different pairs of the phase lock loops are compared in comparators 36, 38 to provide signals on lines 40 and 42 respectively, that indicate the magnitude, that is, the phase angle in degrees, of a predetermined sense of the phase difference between the inputs to the comparators. In the above-identified application (now abandoned) for Non-Ambiguous Phase Meter of Robert L. Wood, details of such a comparator are shown.

The entire disclosure of this copending application is incorporated herein by this reference as though fully set forth.

As indicated in the application of Robert L. Wood, the comparator output is a pulse having a width proportional to the phase angle of a single predetermined sense of the phase difference between the inputs. In other words, the width is proportional to the number of degrees by which one of the inputs is leading the other. Accordingly, no ambiguity as to which is leading exists.

The comparator outputs are fed to suitable display devices as may be deemed necessary or desirable. Illustrated in FIG. 2 for purposes of exposition are digital encoders 43, 44 each responsive to a respective comparator output and each providing an output to a suitable digital display 45, 46 and each providing an input to update a lane counter 47, 48. Each lane counter is initially set when the navigation receiver is first begun to operate, set by some means such as dead reckoning to identify a particular lane of the Omega system. As variation of the measured phase difference (at the output of the comparators) indicates motion of the receiver from one lane to another, the number in the lane counter is accordingly changed.

The output of the comparators are also fed to analog displays 49, 50, which may be in the form of phase meters, to enable additional readout of the measured phase differences.

Conveniently an output of one of the phase lock loops which is a pulse train at the Omega station frequency of 10.2 kHz is fed to the station commutator 22 to provide a timing input to a divider thereof as will be more particularly described below.

Station commutator

Figure 3:
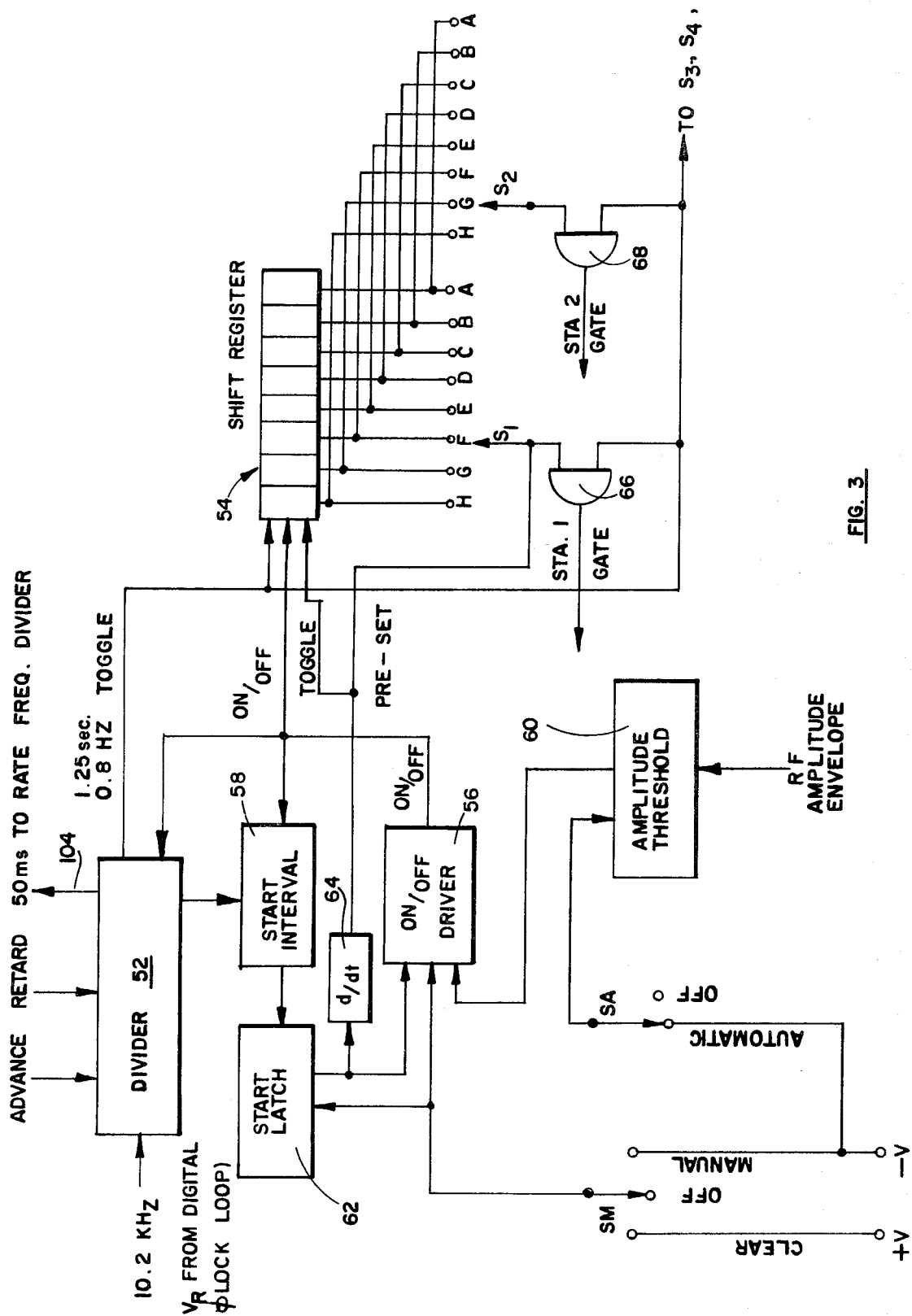
FIG. 3 is a block diagram of the station commutator.

Illustrated in FIG. 3 is a block diagram of the station commutator that enables selection of stations to be tracked and provides for semi-automatic synchronization of phase lock loop operation with the sequential and discontinuous transmission of the several Omega stations. A station commutator frequency divider 52 receives a 10.2 kHz triggering signal from a seleted one of the phase lock loops and employs a number of interconnected flip flops to divide this signal so as to provide at its output a signal having a frequency of 0.8 Hz. This signal is fed as a toggle input to each flip flop of an eight-stage recycling shift register 54.

The station commutator provides for manual or semi-automatic start and selection of the stations of which the transmitted signal phases are to be compared. It generates the several station gating signals that turn on the several digital phase lock loops. Thus, the station commutator, by means of its gating signals, in effect assigns individual ones of the digital phase lock loops to selected transmitting stations. Since the commutator employs a number of flip flops sequentially interconnected to provide a dividing function, certain outputs may be employed, as described below, for timing and delay as may be otherwise required in other parts of the system.

The eight stage shift register 54 continuously cycles a single unique stage condition at the 0.8 Hz repetition rate, which is output frequency of the divider 52. The shift register provides an output from each of its eight stages, at output terminals labeled A through H, respectively, to the corresponding terminals of four station selector switches $S_1$, $S_2$, $S_3$ and $S_4$, of which only $S_1$ and $S_2$ are shown. $S_3$ and $S_4$ (not shown) are each identical to $S_2$. A manual start switch $S_M$ is provided having positions identified as CLEAR, OFF and MANUAL. In the CLEAR position, a signal is sent to a start driver 56 that thereupon sends a clear signal to clear all of the flip flops of the divider, the shift register and also the flip flops of a start interval generator 58. For semi-automatic operation, after clearing all the flip flops and returning switch $S_M$ to OFF, a second switch $S_A$ is placed in Automatic position which then enables an amplitude threshold detector 60 having an input in the form of the radio frequency (RF) Omega signals transmitted from several remote stations and received by the receiver. The threshold detector 60 provides an output when its RF input has an amplitude that exceeds a predetermined value. As long as the amplitude of a received Omega signal exceeds the predetermined threshold, a signal is sent from detector 60 to the start driver 56 which releases the CLEAR of the shift register, the divider and the start internal generator, whereupon the divider starts to run and the start interval generator 58 begins to time out a predetermined interval, such as 725 milliseconds in a particular embodiment.

If the input to the amplitude threshold detector is of a short duration, as for example when the circuit has been started near the end of a transmission time of a selected nearest station, the output of the amplitude threshold detector will terminate before the start interval generator has completed its period and all circuits are turned off by a clear signal from the start driver. However, should the input signal continue throughout the period of the start interval generator, it is known that a station has been acquired and that the receiver has been started at a sufficiently early time within the transmission time of a given station. Accordingly, the start interval generator, when it times out, conditions a start latch circuit 62 that sends a signal to the start driver 56 to hold the driver in its running condition throughout the operation of the receiver, until a manual clear signal is again provided from switch $S_M$.

By aural or visual observation of several transmitted station signals the receiver operator can determine the nearest station, which is the station of maximum amplitude of received signal. The operator will set switch $S_1$ to the switch terminal representing that station. If such strongest station is station F, $S_1$ is set to the exemplary position illustrated in FIG. 3.

It is desired to start the receiver running in substantial synchronism with the transmissions from respective stations and to synchronize the phase of the shift register with the successive station transmissions. In other words, the station selector switch $S_1$ should provide a gate signal during the transmission of the selected station, station F in the illustrated position. Thus, the shift register stage corresponding to the switch terminal labeled F must have a unique bit, e.g., such stage is "on" while all other shift register stages are "off" during the time of transmission from Omega station F. Accordingly, having determined that station F is the maximum amplitude or closest station (in this example), having set switch $S_1$ to the F position and further, having initially cleared the receiver by positioning the switch $S_M$ in the CLEAR position, the operator will move switches $S_M$ to off and $S_A$ to automatic position approximately at the beginning of transmission of station F.

This time of station F transmission may be determined by visual or aural observation of the Omega signals which are thus identified by amplitude. Station identification can also be determined by reference to standard time transmissions, knowing the time of beginning of each Omega cycle and the sequence of transmissions.

By the signal strength method of identification, the various stations may be recognized by the relative sound level or the height of the various signals on an oscilloscope. In recognition of the signal aurally, the signals from the nearest stations will sound loud while those from further stations will sound weak or may not be heard at all. By visual observation on a display, the amplitude of the signals from the nearest stations will appear large while those from further stations may appear small or not be seen at all. These methods depend upon observing or listening to the entire signal format, that is, to an entire Omega cycle. Since the sequence of transmission of the Omega stations is timed to begin at an intergral 10 second period of standard time, station identification can alternatively be established by reference to standard time transmissions to within one second. Thus, in the described semi-automatic start mode the station commutator has been started by the operator substantially at the beginning of transmission of the selected station F, and the output of the amplitude threshold detector 60 provides a start signal via start driver 56.

All stages of the shift register are in the clear state and none changes even though the toggle input is provided from the divider, which is now running. It may be noted at this time that the master oscillator 28 and certain parts of the phase lock loops (which provide an input to divider 52) run continuously, and are unaffected by the start driver 56. If the operator has timed his start to within the first several hundred milliseconds of the selected signal, the start interval generator 58 will time out before the end of the transmission of station F and will thus trigger start latch 62 to hold the circuits in running condition.

When the start latch is triggered, its output is differentiated in circuit 64 and sent as a toggle signal to all shift register stages and also as an input to the clear logic input of the selected shift register stage via the selector switch $S_1$. Thus, the shift register stage corresponding to station F is provided with a unique state during the station F transmission. Thereafter all stages of the shift register continued to be toggled at a frequency of 0.8 Hz to provide the successive gate signals A through H corresponding to stations A through H during mutually equal time periods of each full 10 second Omega cycle, as shown in lines ($e$), ($f$), ($g$) and ($h$) of FIG. 1.

Now the shift register has been synchronized, caused to cycle its unique stage in phase with the cyclic transmission from the several stations. Selector switch $S_1$ together with each of the other selector switches $S_2$, $S_3$ and $S_4$ may be positioned at any desired station whose phases are to be compared. The start latch remains in running condition. The divider continues to provide the repetitive shift register toggle input of 0.8 Hz and the digital phase lock loops will generate the appropriate signals for phase comparison.

Since the digital phase lock loops do not require a full 1 second (approximately) of the Omega station transmission to complete their tracking, it is convenient to gate these on for a period that is one-half the period of the 0.8 Hz toggle signal. Accordingly, the outputs of the respective panel selector switches $S_1$ and $S_2$, etc., are fed as first inputs to station 1, station 2, etc., coincidence gates 66, 68, respectively, each of which has an enabling input the 0.8 Hz toggle signal. Since the toggle signal is a square wave with a period of 1.25 seconds, it will have a polarity appropriate to enable the coincidence gates only during one-half of its cycle, that is, for 625 milliseconds. Accordingly, the station output gating pulses from gates 66, 68 and others (not shown) for $S_3$ and $S_4$, will occur during 625 milliseconds of the unique state of the shift register stage to which its respective selector switch has been positioned.

As the shift register of the commutator continues its repetitive cycling, its stages are uniquely on as indicated on lines ($e$), ($f$), ($g$) and ($h$) of FIG. 1. The 0.8 Hz shift register toggling signal is shown in line ($i$) and the output of the several station gates 66, 68, etc. for selection of stations A, B, C and H are shown in lines ($j$), ($l$) and ($m$), respectively. Thus, it will be seen that each shift register stage is uniquely on for an equal interval which is one-eighth of the total 10 second Omega cycle and each station gate signal is uniquely true for one-half of the on time of the unique state of a shift register stage. The 625 millisecond duration of each station gate signal has been determined to be more than adequate to allow the digital phase tracking loop to search for and settle upon the predetermined fixed phase relation with the selected incoming station signal.

The phasing of the shift register cycling relative to the sequential transmission of Omega stations may be advanced during operation by feeding an advance signal to the divider to provide early toggling of certain of the flip flops of divider 52. For retarding the shift register, a signal may be fed to inhibit toggling of certain of the flip flops.

For manual start switch $S_A$ remains in OFF position and $S_M$ is moved to MANUAL position, from CLEAR position, at the beginning of the transmission from the selected station (to which $S_1$ has been positioned). When the period of the interval generator has ended, the start driver 56 is held in running condition by the latch 62 just as in semi-automatic operation. It will be seen that the start interval generator and start latch are not required for manual start (being necessary only for semi-automatic start) but are employed in this mode for convenience.

Digital Phase Lock Loop

The function of each digital phase lock loop is to receive a selected one of the transmitted station signals and to generate a continuous output signal, at the transmitted signal frequency, that has a fixed phase relation with respect to the phase of the transmitted station signal. Thus, even after the station signal RF pulse has terminated, its phase may be compared with the phase of another station signal that is tracked by a second phase lock loop.

Figure 4:
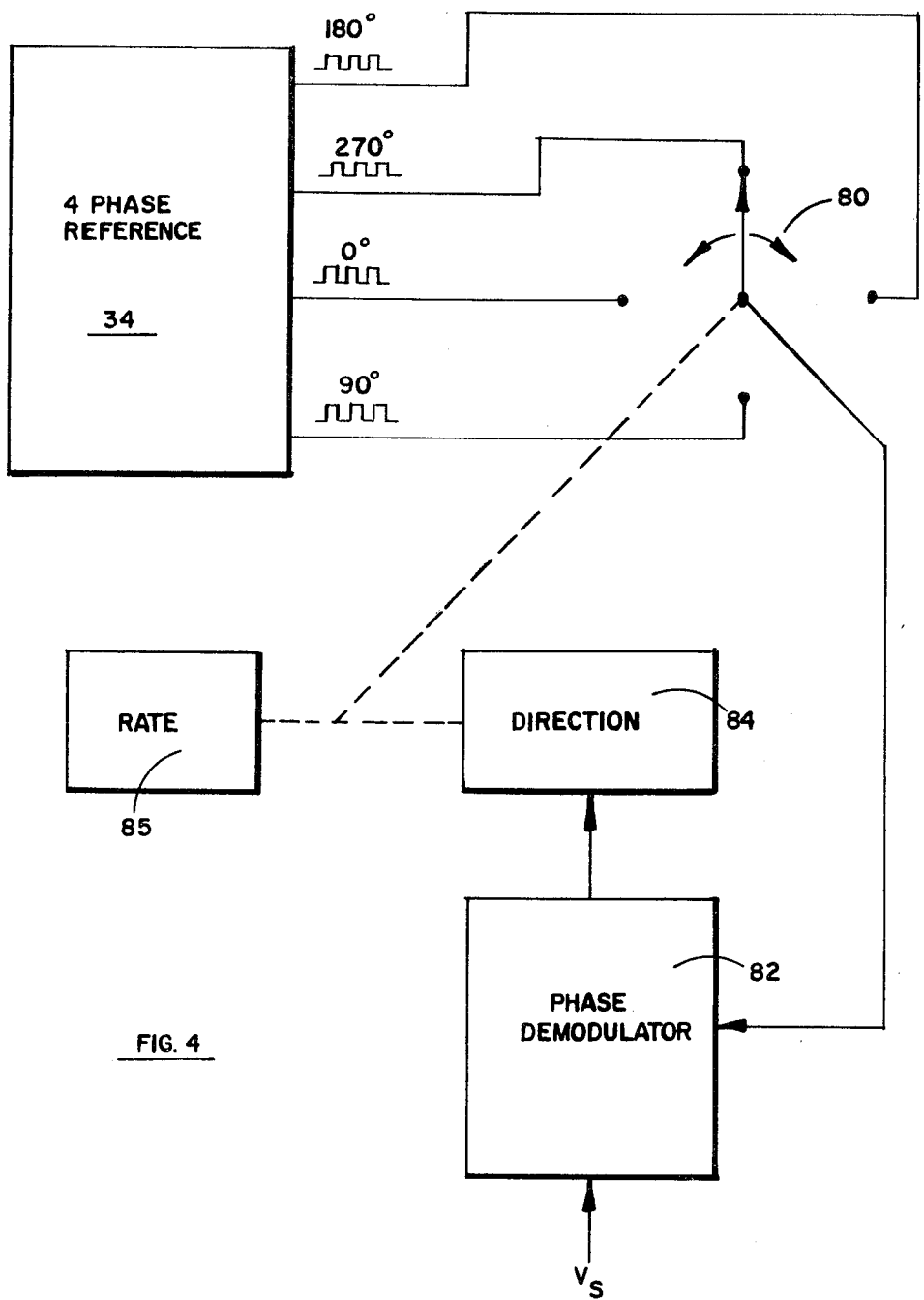
FIG. 4 is a functional diagram illustrating operation of a digital phase tracking loop.

The digital phase lock loops employ reference components from the four phase reference signal generator 34, FIGS. 2 and 4. Four components of the reference phase signal are generated from the clock signal that is provided at the output of waveshaper 30. The clock signal is illustrated as waveshape 70 in line ($a$) of FIG. 6. Suitable logic of the reference phase generator 34 to be described hereinafter enables the production of reference signal components as four separate pulse trains shown in lines ($d$), ($e$), ($f$) and ($g$) of FIG. 6 as reference phase pulse trains 72, 74, 76, 78, respectively. Assuming the clock pulse derived from the oscillator 28 has a frequency of 1.632 mHz, each of the reference phase pulse trains has a frequency or repetition rate of 408 mHz and each is phase displaced from the immediately adjoining reference phase component by 90°. Accordingly, the several reference phase pulse trains may be labeled 180°, 270°, 0° and 90°, respectively, for pulse trains 72 through 78, respectively.

A digital phase tracking loop is heuristically illustrated in FIG. 4. It includes a reference phase component search and selecting circuit, schematically illustrated as a bi-directional rotary switch 80. As the switch rotates, it sequentially connects to its common output terminal each of the four reference phase components that are fed from the reference generator 34 to respective input terminals of switch 80. The connection (or selection) is in a first sequence of a first sense (as in clockwise rotation for example) or in a second sequence of a second sense (as in counterclockwise rotation of the switch, for example). The stepping of the switch 80 from one of the reference phase components (e.g., from one of its input terminals to the next) to the next is at a rate that is considerably less than the repetition rate of each of the reference phase pulse trains for reasons that will be more particularly described hereinafter. Accordingly, the switch rests on each input terminal for a time sufficient to transmit a number of pulses of the train applied to such terminal, and then moves to the next input terminal where it again rests before moving on.

With the search and selector switch 80 in a given position, one of the reference phase pulse trains is fed as a first input to a phase demodulator 82 which receives as its second input the station signal of which the phase is to be tracked. (In an exemplary embodiment all station signals are fed to all phase lock loops, which are sequentially operated.) The output of the phase demodulator has one polarity or the other depending upon the sense of the phase difference between its two inputs. This bipolar output sets a direction circuit 84 in one sense or the other so as to cause rotation of the search and selector switch 80 in one sense or the other depending upon the polarity of the measured phase difference.

Speed of stepping from one phase reference to the next as achieved by the search and selection switch 80 is controlled by a rate circuit 85. The circuit is arranged so that the searching (rotation) of switch 80 will progress in a direction that will tend to decrease the magnitude of the phase difference indicated by the phase demodulator. Accordingly, a condition will be reached at which the two phases are substantially in the predetermined fixed relation (phase quadrature in the specific embodiment employed herein). The output of the phase demodulator will rapidly reverse in polarity to cause the direction circuit 84 to move the switch 80 back and forth between two adjacent input terminals.

Figure 5:
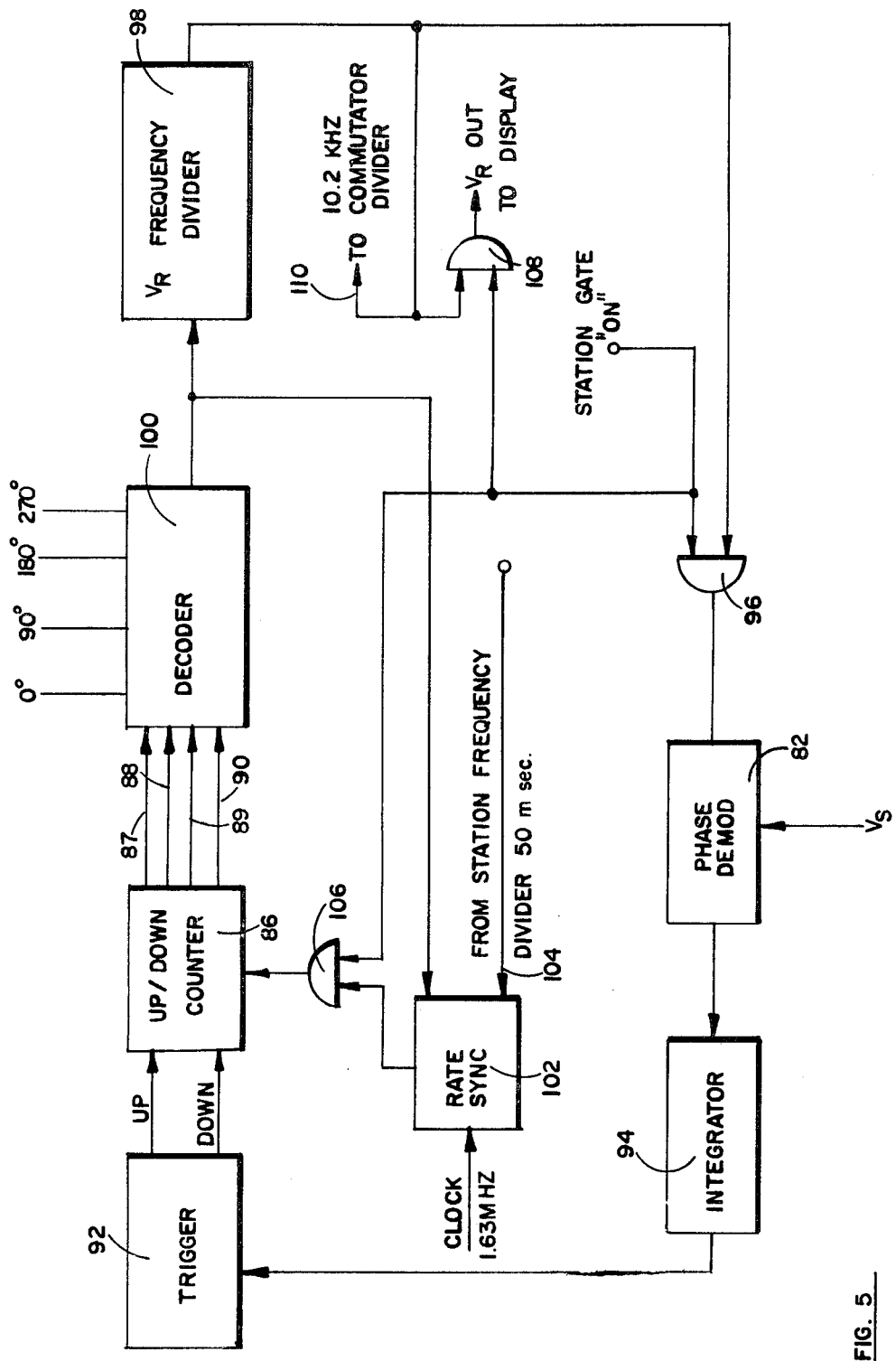
FIG. 5 is a block diagram of a digital phase tracking loop employed in the receiver of FIG. 2.

The above-described digital phase tracking operation is achieved in the embodiment described herein as illustrated in FIG. 5. Since all digital phase lock loops are identical, only one need be described in detail. The circuit employs an up/down counter 86 that, during counting in either of its two directions, will provide an output signal on four output lines 87, 88, 89 and 90, respectively, and in the sequence of the counting of the counter. Direction of counting is controlled from a pair of outputs of a direction trigger circuit 92 which is shifted to one state or the other by the output of an integrator 94 that receives and filters the output of phase demodulator 82. Phase demodulator 82 receives as a first input the signal $V_s$ which is the transmitted station signal received by the receiver and assigned to this particular digital phase lock loop by the station commutator gating signals. The second or reference input to the phase demodulator is provided at the output of a coincidence circuit 96 having a first input from the station gate signal that is connected to the particular digital phase lock loop illustrated in FIG. 5. This station gate input of coincidence gate 96 is derived from station gate 66 of FIG. 3 or a corresponding station gate one of the other panel selector switches $S_1$, $S_2$, $S_3$, $S_4$) that corresponds to the particular assignment of a given digital phase lock loop to a station selector switch.

The second input to coincidence circuit 96 is derived from a $V_R$ frequency divider 98 that divides the 408 kHz selected reference phase pulse train by a suitable number (40 in the described embodiment). It may be noted at this point that where specific parameters such as frequencies, numbers of pairs of phase tracking loops, comparators or panel selector switches, timing and dividing numbers are specified herein, they are so specified solely for purposes of exposition in order to afford a better understanding of the specific embodiment and are not meant by way of limitation. Such parameters obviously may be varied as deemed necessary or desirable for different receiving situations.

The input to frequency divider 98 is one of the four reference pulse trains indicated at 0°, 90°, 180°, 270° that are fed as a first group of inputs to a decoder 100 that selects one of these inputs. A second group of inputs to the decoder are the four sequential outputs of the up/down counter 86. Accordingly, the combination of decoder 100 and up/down counter 88 is functionally equivalent to the search and selection rotary switch 80 of FIG. 4. Direction control 84 of FIG. 4 is analogous to the combination of the integrator 94 and trigger circuit 92 which controls direction of the counting of the up/down counter.

The counting rate of the counter is under control of a rate synchronization circuit 102 that receives a first input from the 1.632 mHz system clock. Rate synchronization circuit 102 is timed from a signal such as a 50 millisecond signal on line 104 obtained from the station frequency divider. The output of circuit 102 is fed to a coincidence circuit 106 which is enabled by the station gate. Circuit 106 provides the triggering (counting) input to the up/down counter. The 50 millisecond period of the timing signal on line 104 is chosen in relation to the integrating circuit time constant, the latter being in the order of but not greater than the interval between successive counts of the up/down counter. For purposes to be more particularly described below in connection with a detailed explanation of the rate synchronization of the up/down counter, a 408 kHz signal is also fed to the rate synchronization circuit to insure selection of an appropriate one of the four reference phases when counting direction is reversed.

An output of the digital phase lock loop is derived from the output of the $V_R$ frequency divider 98 via a coincidence gate 108 which is gated on by the station gate signal for the particular digital phase lock loop that is illustrated herein. Accordingly, it will be seen that each of the gates 96, 106 and 98 of the digital phase lock loop are operable only during the gating time of the individual tracking loop, but the tracking signal output is continuous, even in the absence of a signal from the station assigned to the particular loop. Thus, the digital phase lock loop provides a continuous ungated pulse train output on line 110 at the 10.2 kHz frequency and having a phase fixed relative to the transmitted station signal that is assigned to this particular phase lock loop. This continuous phase locked signal is fed to the commutator divider 52 (FIG. 3) as a counting input thereto and is also fed as a first input to a comparator that has a second phase locked signal corresponding to the phase of a second station signal with which comparison is to be made.

The output of gate 108 is employed to provide a display of the commutator gate for the station assigned to this phase lock loop.

Figure 6B:
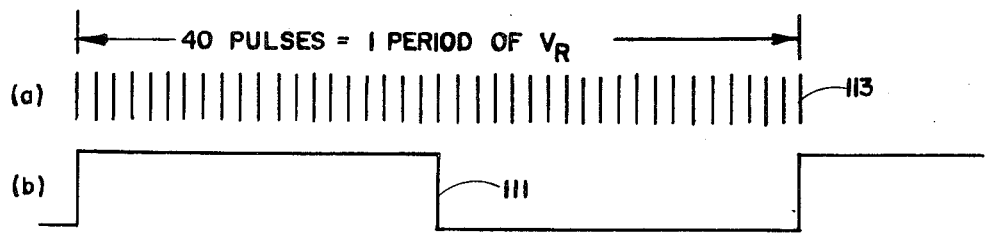
FIGS. 6a and 6b are synchographs illustrating the four-phase reference timing for the digital phase tracking loop and other signals of a specific embodiment.

Indicated in line (a) of FIG. 6b is a single one of the four reference phase components, such as the 0° component for example. The output signal $V_R$, waveform 111 in FIG. 6b, has a frequency of 10.2 kHz and the selected one of the four reference phase signals, waveform 113 of line (a) of FIG. 6b, has a frequency of 408 mHz. The arrangement is such that one full cycle of 360° of the reference phase components is divided into 160 parts. Accordingly, the phase searching is done on a step by step basis with each step providing a unit of phase change that is equal to 1/160 of a full 360° cycle of any single reference phase component. This 160 unit granularity of the digital phase lock loop may be explained as follows: When the phase searching shifts from one reference phase such as the 0° reference phase to another such a 90° or 270° reference phase (by changing from one count to another of the counter 86), the output signal of the $V_R$ divider 98 is shifted by one-quarter of the period between successive pulses of a single one of the reference phase pulse trains. The period of a single one of the reference phase pulse trains is 1/40 of the period of the output signal $V_R$, because the divider 98 divides by 40 in this exemplary embodiment. Accordingly, each step in the phase search is ¼ of 1/40 or 1/160 of the period of $V_R$.

Four components of the reference signal are employed for ease of mechanization. A multi-component reference signal having more or less than four differently phased components may be employed, but at the cost of increased complexity of circuitry of dividers and the like.

In a specific embodiment, in order to improve bandwidth and signal to noise ratio as will be more particularly described in connection with the rate synchronization of the digital phase lock loop, the stepping of the reference phase searching from one phase reference pulse train to a next phase reference pulse train is delayed so as to occur at considerably longer intervals, such as intervals of 50 milliseconds. Accordingly, even though the output of the phase demodulator indicates a significant phase difference, the same one of the four reference phase pulse trains continues to be fed to the phase demodulator (and to the output of the digital phase lock loop) for 50 milliseconds. At the end of such 50 millisecond interval the rate sync circuit 102 causes the up/down counter to move to its next count at which time the phase tracking system steps one unit, which is 1/160 of a full period of its output $V_R$. As the counter counts in a first direction, it causes the decoder to provide at its output the pulse trains in the sequence 270°, 180°, 90°, 0°, 270°, etc. When counting in the other direction the decoder output is in the sequence of 270°, 0°, 90°, 180°, 270°, etc. This triggering of the up/down counter and selection of the next reference phase component in a sequence of appropriate sense continues until the desired fixed phase relation between the output $V_R$ and the input $V_s$ has been achieved.

Figure 7:
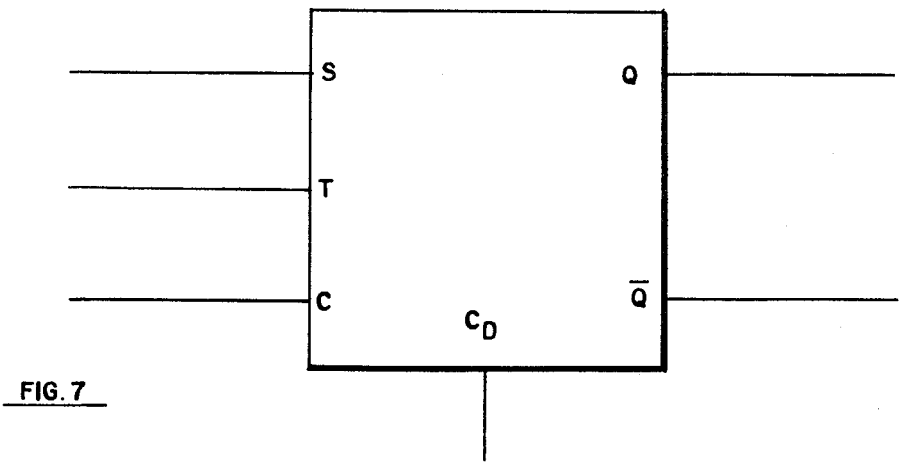
FIG. 7 illustrates a typical flip-flop employed in the described system.

Although many different types of bistable devices or flip flops may be employed and different types of logic such as diode transistor logic (DTL) or transistor transistor logic (TTL), etc., may be employed, the exemplary embodiment disclosed in detail in FIGS. 8 through 12 employs flip flops of the J-K type and RTL (Resistor Transistor Logic) wherein 0 volts is true and +0.7 volts is false. Details of an exemplary flip flop are shown in FIG. 7. In the exemplary embodiment described herein, the flip flops are of the type Mc776P or Mc876P produced by Motorola Semiconductor Products Inc. Detailed circuitry and operating conditions of these flip flops are shown in Data Sheet "Plastic MRTL Sheet 3.1R1." Each flip flop includes a toggle input T, a logic set input S, a logic clear input C, and a flip flop clear input $C_d$. Each provides a pair of outputs of mutually exclusive states labeled Q and $\overline{Q}$. A high input to the $C_d$ flip flop terminal will place the flip flop in clear state. A low input will allow the flip flop to run and change state according to the other inputs thereto. The flip flop will change state upon the fall of an input at T, when there is a high input to one of its logic inputs S or C. Accordingly, if there exists a high input to logic input S and the flip flop is presently in a clear state, upon fall of a toggle input to terminal T, the flip flop will change states to attain a set state. Similarly, if in set state and a high input to the C terminal exists, the flip flop will become clear upon the next fall of a toggle input. When in set condition the Q output terminal is true and $\overline{Q}$ false and vice versa when in clear condition. The flip flop will also toggle when both S and C inputs are high or when both are low.

By way of example, without limitation, the logic gates employed in the detailed circuit drawings of FIGS. 8–12 are NOR gates made by Motorola Semiconductor Products Inc., Mc793P or Mc893P. When all inputs are low the output is high. When one or more inputs are high the output is low. The Motorola NOR gates that are actually used have three inputs. When used as a three input coincidence gate (inverting) all inputs are employed. When used as a two input gate, the third input is grounded. For simplicity of the drawings, all gates used as two input gates do not show the third grounded input. When two inputs are grounded (gates shown in these drawings with one input grounded) the gate is an inverter. These gates will provide either an inverting OR function (for high inputs), an inverting AND function for low inputs, or simply an inverting function. Details of a triple 3-input gate are shown in Motorola Data Sheet "Plastic MRTL Sheet 1.2."

Rate Synchronization

Figure 13:
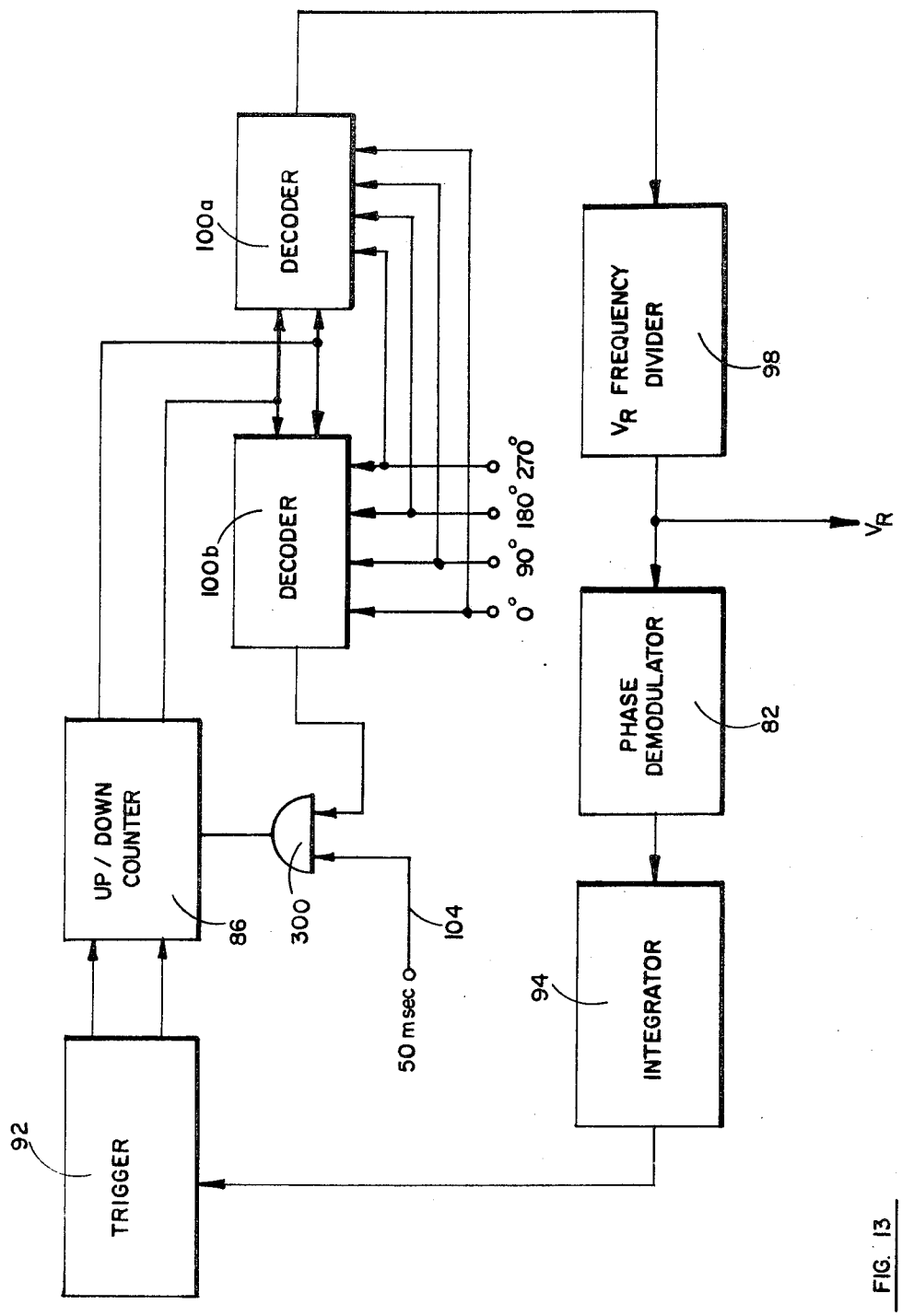
FIG. 13 is a block diagram of a modified digital phase lock loop.

The counting input to the reversible counter 86 of the embodiment of the digital phase lock loop shown in FIG. 5 is achieved by a pair of flip flops 112, 114, illustrated in FIG. 8 and described below. An alternate rate synchronization circuit is shown in FIG. 13 and described below. Flip flop 112 receives a counting interval or counting rate input in the form of opposite polarity clear and set logic inputs directly and via an inverting gate 116 from the 50 ms period output on line 104 obtained from the station frequency divider 52. The toggle input to flip flop 112 is provided from the decoder 100 in the form of the 408 kH3 signal. The Q and $\overline{Q}$ outputs of flip flop 112 are fed respectively to the set and clear logic inputs of flip flop 114 which is toggled by the 1.632 mHz clock signal. The Q output of flip flop 114 appears on line 118 and is fed to the coincidence gate 106 (FIG. 5) to trigger the up/down counter to its next count during the on time assigned to this particular digital phase lock loop. The flip flops 112, 114 and associated circuitry are unique to a single one of the digital phase lock loops and each of the other phase lock loops is provided with an identical circuit for rate synchronization.

Figure 8:
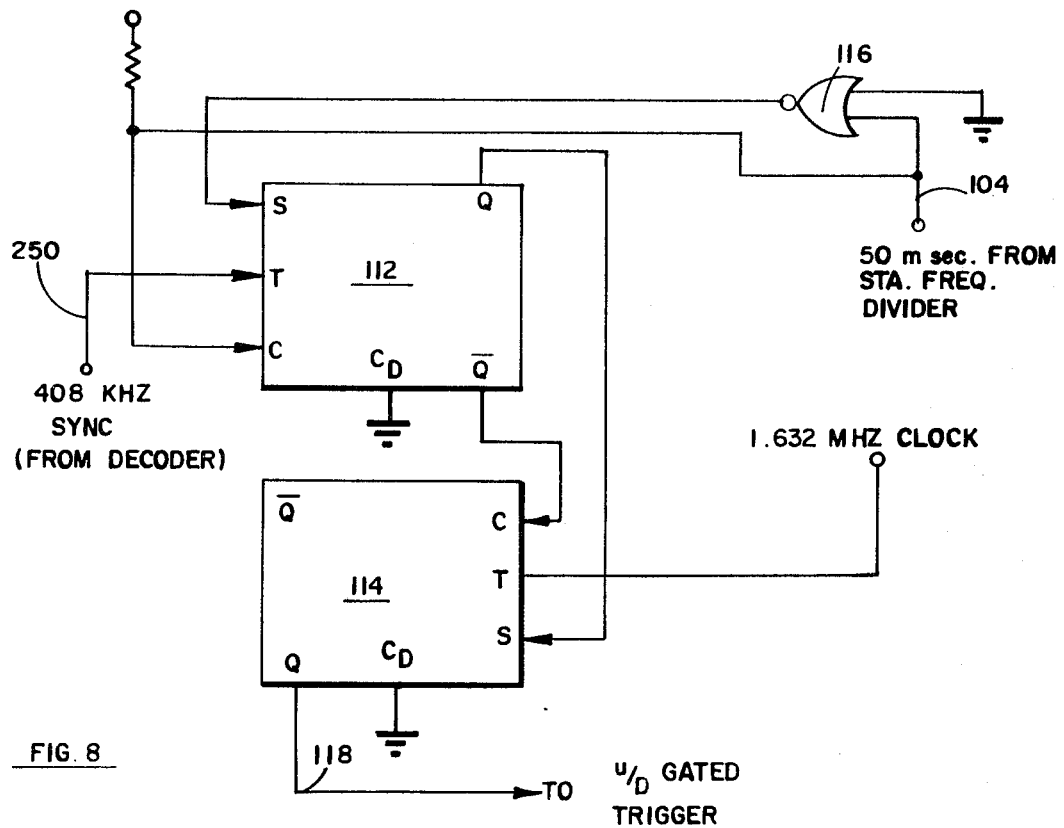
FIG. 8 illustrates details of rate synchronization of a digital phase lock loop.

Control of the counting input to the up/down counter of each digital phase lock loop circuit, as provided by the rate synchronizing circuit of FIG. 8, enables control of bandwidth and signal-to-noise ratio. The longer the integrating time constant of the digital phase lock loop, the smaller the bandwidth and the greater the signal-to-noise ratio. Conversely, as the bandwidth is narrowed and the time constant is increased, the maximum allowable speed of travel of the vehicle carrying the receiver becomes less. In any event, an optimum integrating time constant, (for the integrating amplifier 94 at the output of the phase demodulator 82) is chosen as a compromise between narrowed bandwidth and increased signal-to-noise ratio on the one hand and desired speed of travel on the other. In the embodiment of the present invention that has been built, a 50 millisecond time constant is chosen as allowing for speeds of up to 160 knots and also providing a satisfactory bandwidth narrowing.

The time constant chosen for the integrator must correspond to the counting rate of the up/down counter. The integrating time constant must be equal to or less than the selected interval between successive counts of the up/down counter. If another integrator time constant is chosen, a different but corresponding counting interval will also be chosen.

A primary purpose of the rate synchronization circuit is to trigger the up/down counter at intervals that correspond to the RC time constant of the phase lock loop circuit. Further, the counting input to up/down counter is synchronized to occur between successive pulses of successively selected reference phase pulse trains. It will be recalled that the up/down counter may provide pulses from reference phase pulse trains in an increasing order 0°, 90°, 180°, 270° when counting in one direction and in a decreasing order 0°, 279°, 180°, 90° when counting in the opposite direction. When the counter is triggered by the output of the rate synchronization circuit, it should select (via decoder 100) the next one of the four reference phase pulse trains (0°, 90°, 180° or 270°) whether counting up or counting down. It will be understood that pulses of any one train of reference phase pulses are continuously selected (for the period of the counting input to the counter) before the counter changes to select another reference phase pulse train.

Figure 6A:
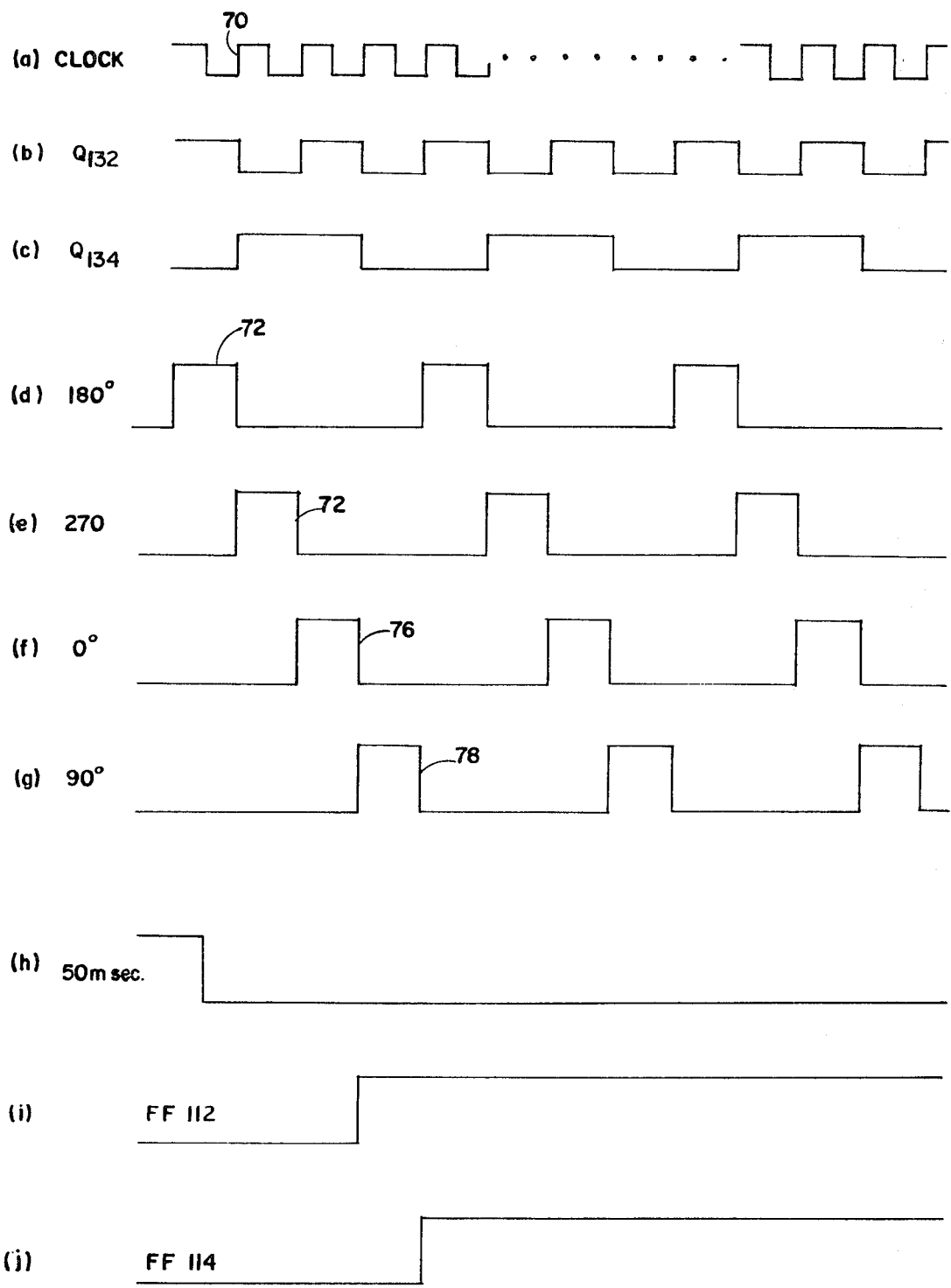

Referring to FIG. 6a, assume that the counter is at a count in which the 0° reference phase pulse train is selected by the decoder and it is counting down. It is desired that the counter be triggered to count to its next higher count at the end of a 50 millisecond interval, but also at a time between pulses (after a pulse such as 76 of the 0° train and before the next pulse 74a of the 270° train). On the other hand, if starting from the 0° reference phase pulse train and the counter is counting up, at the end of the 50 millisecond interval the up/down counter should be triggered after a 0° pulse 76 but before a 90° pulse. However, the very next 90° pulse 78 follows immediately after such 0° pulse 76. The counter should change only between (not during) selected pulses. For this reason, the rate synchronization circuit output is delayed by one clock pulse interval. When the 50 millisecond counter timing pulse, shown in line ($h$) of FIG. 6a, goes false, FF112 set logic is true and FF112 toggles on the fall of the next pulse (76) of the 0° reference phase train as shown in line ($i$) of FIG. 6a. This provides a true input to the set logic input of FF114 which toggles on the fall of the next clock as shown in line ($j$) of FIG. 6a. The output on lead 118 of FF114 actuates the counter (via gate 106).

The delay of one clock period provided by FF114 ensures that the counter will not change state during a pulse of the next selected reference phase train.

Crystal Oscillator and Reference Phase Tracking Generator

Figure 9:
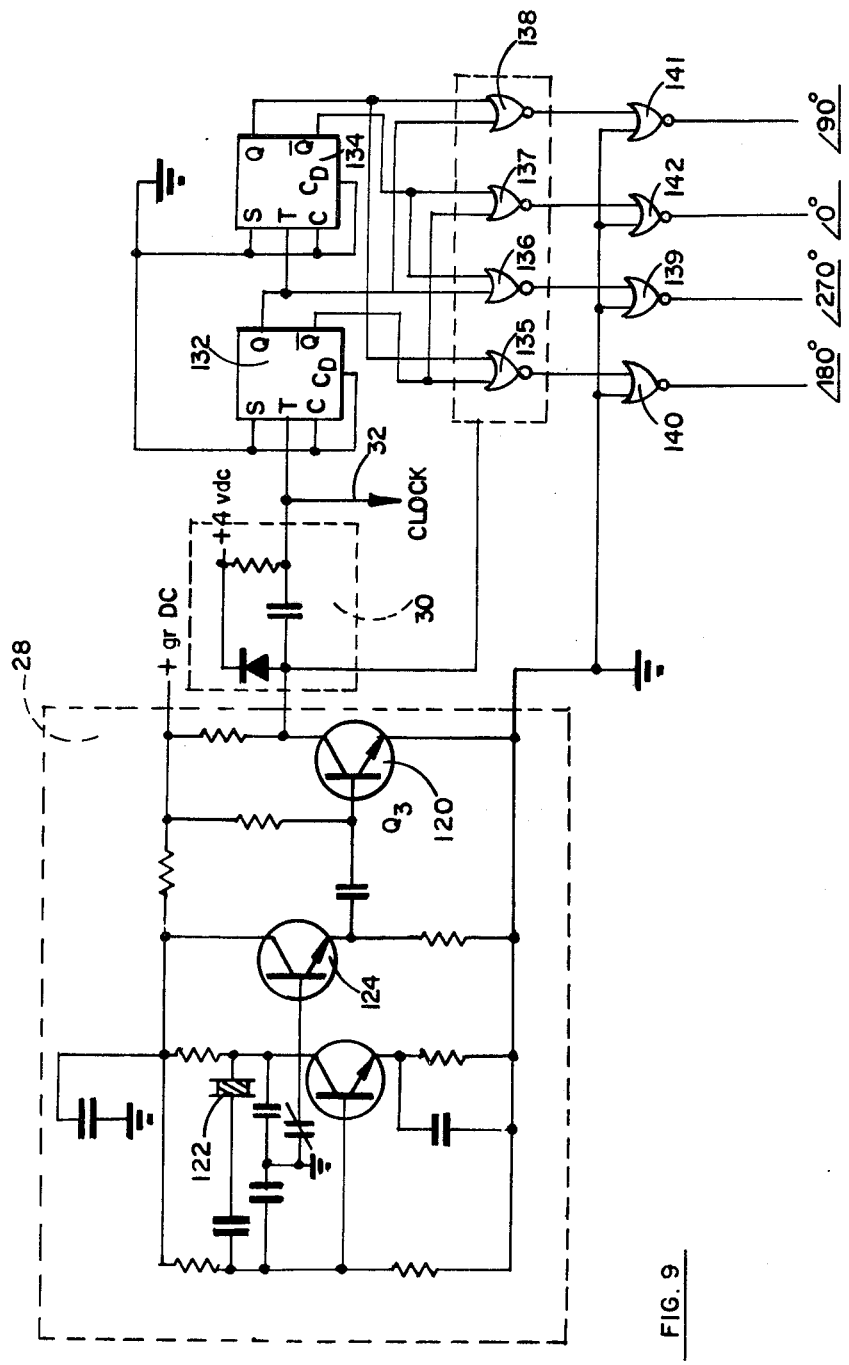
FIG. 9 shows circuit details of the receiver oscillator and four-phase reference generator.

Illustrated in FIG. 9 is the oscillator 28 having a highly stable output signal at the selected clock frequency of 1.632 mHz, under control of a crystal 122, having an emitter follower 124 and an output driver 126. The sinusoidal output of the oscillator is fed to the wave-shaping circuit 30 from which is derived on line 32 the squarewave pulse train 70 forming the system clock pulse shown in line ($a$) of FIG. 6a. The clock signal is fed as a toggle input to a first divide by 2 flip flop 132 which has its Q output fed as the toggle input to a second divide by 2 flip flop 134, the two flip flops being interconnected as shown in FIG. 9 to provide the respective outputs $Q_{132}$ and $Q_{134}$ shown in lines ($b$) and ($c$) of FIG. 6a. The flip flop outputs are combined in gates 135, 136, 137 and 138 and then inverted in inverters 139, 140, 141 and 142 to provide at the outputs of the respective gates the indicated reference phase pulse trains shown in lines ($d$), ($e$), ($f$) and ($g$) of FIG. 6a. This single set of reference pulse trains, as a group, is used as the common reference to all digital phase lock loops.

Station Commutator

Figure 10A:
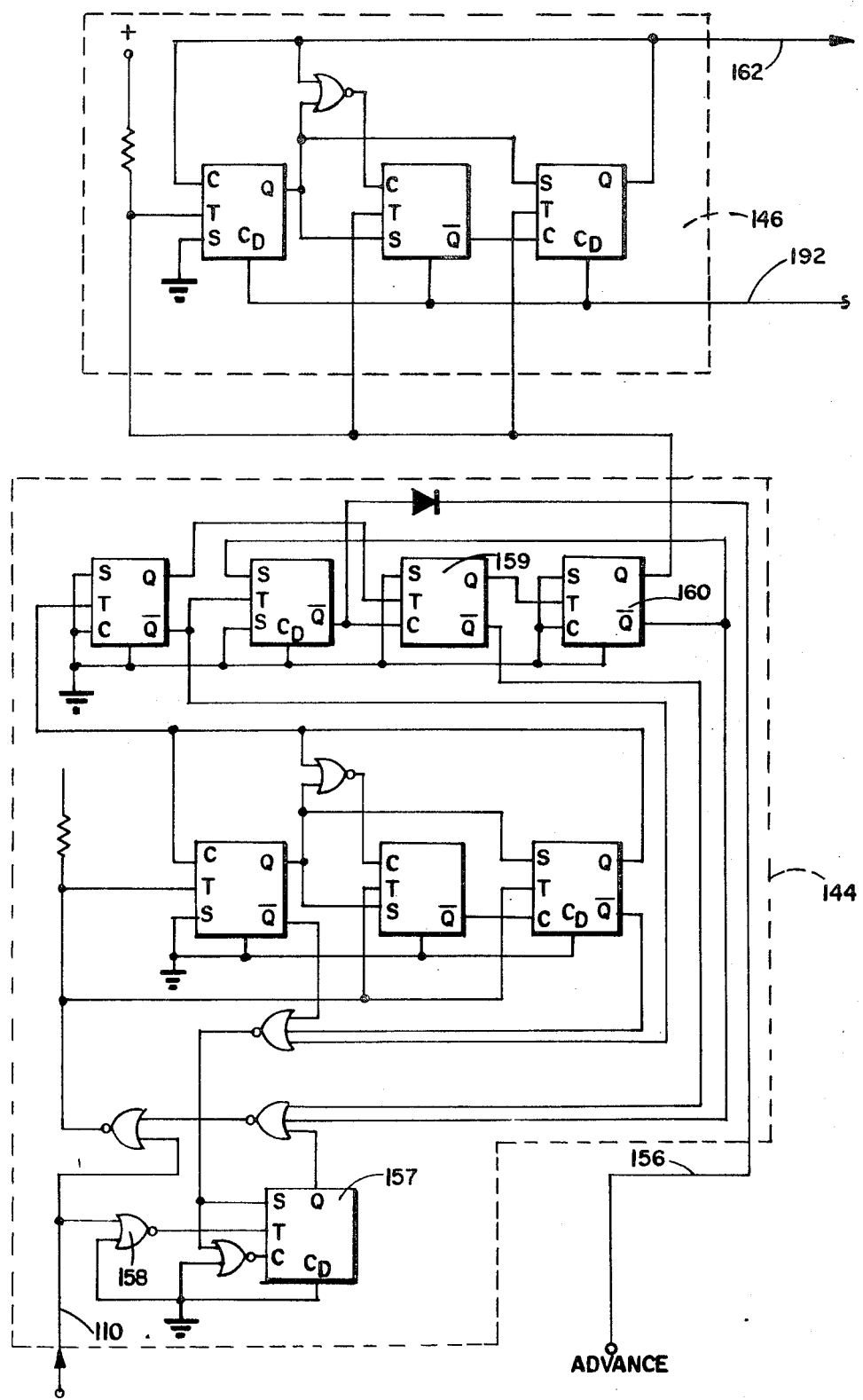
FIGS. 10a, 10b and 10c collectively show circuit details of the station commutator.
Figure 10C:
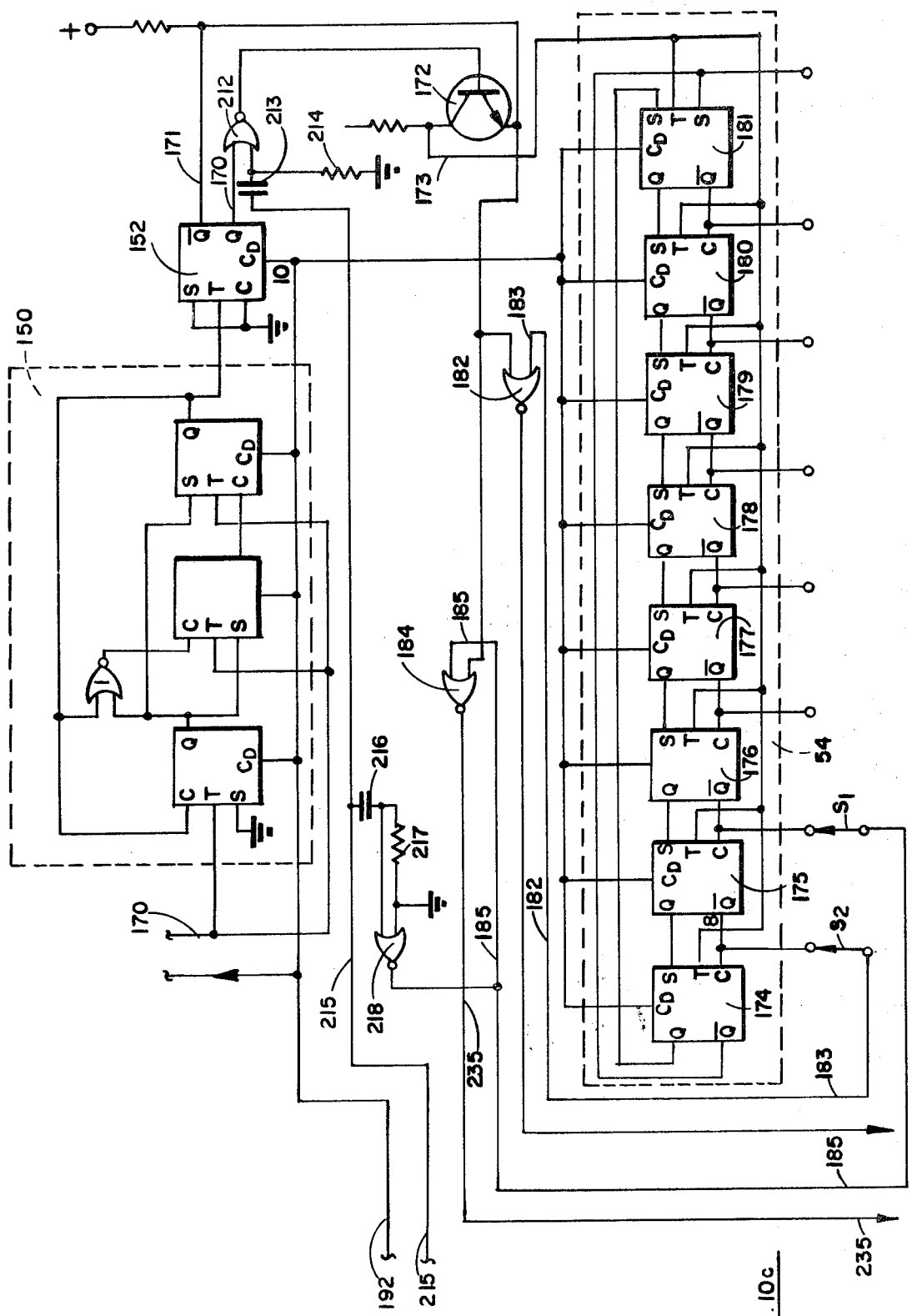
Figure 10B:
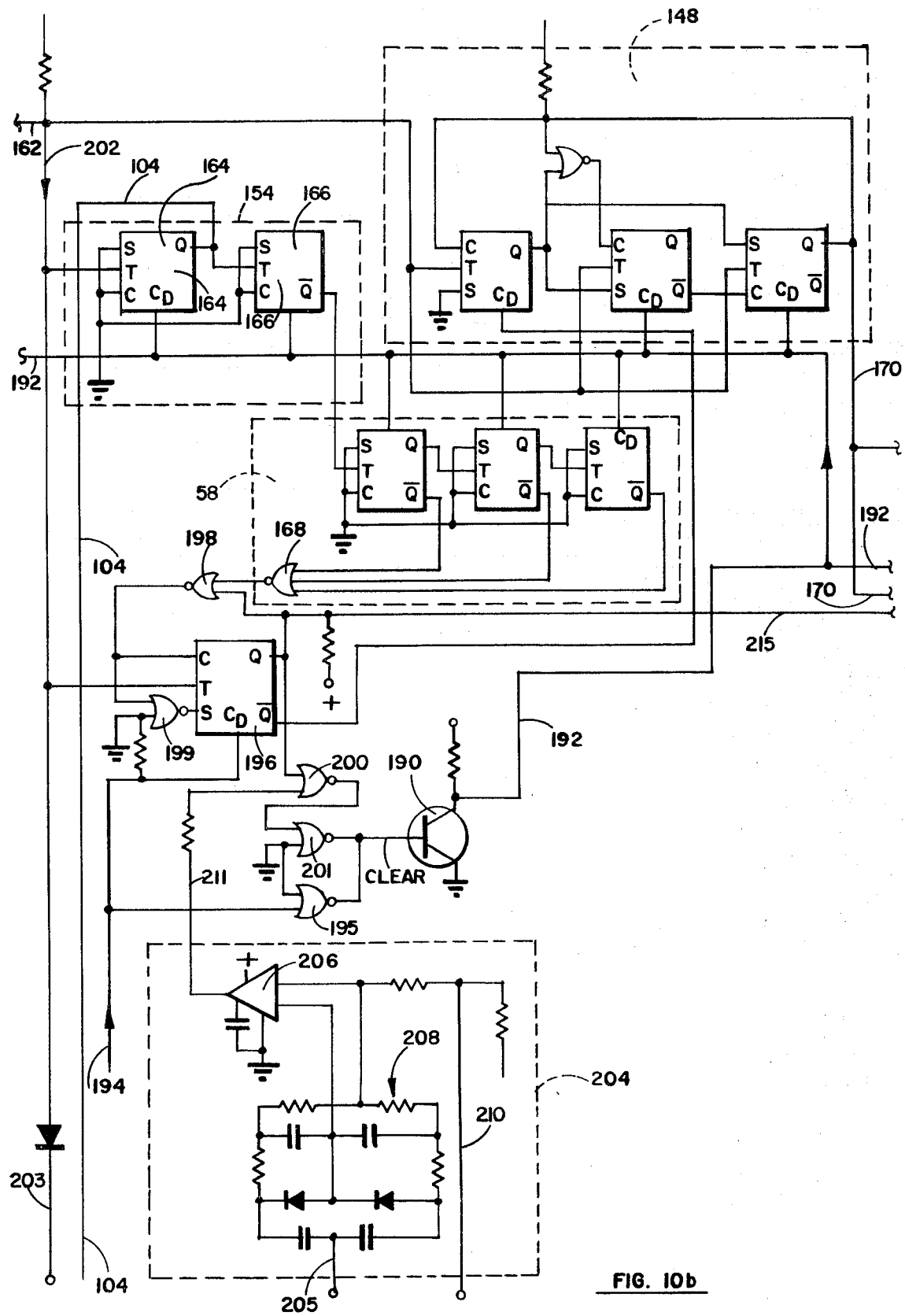

Illustrated in FIGS. 10a, 10b, and 10c, is circuitry of the station commutator including shift register, starting circuits and the station frequency divider. FIGS. 10a, 10b and 10c form a single circuit diagram when placed side by side with FIG. 10a on the left, FIG. 10b in the middle and FIG. 10c on the right. The station frequency divider (divider 52 of FIG. 3) comprises a number of dividers illustrated as a divide by 51 divider 144, a divide by 5 divider 146, a second divide by 5 divider 148, a third divide by 5 divider 150, and a divide by 2 flip flop 152. Also included in the station dividing circuitry are an intermediate interval divider 154 that divides the output of the first divide by 5 circuit 146 and a divider that is employed for the start interval generator 58 of FIG. 3.

Each of the dividers 144, 146 (FIG. 10a), 148 (FIG. 10b), 150 (FIG. 10c), 154 and 58 (FIG. 10b) comprise a series of the above-identified J-K flip flops interconnected via the various gates shown in the drawing. It will be readily appreciated that many different types of frequency dividing circuits including flip flops and gating are well known to those skilled in the art, and other arrangements may be devised as deemed necessary or desirable. The dividers illustrated herein are shown solely for purposes of exposition and encompass conventional techniques of which the details form no part of the present invention.

The input to the first divider 144 is provided on line 110 to toggle the first flip flop 157 of this divider by means of an inverter 158. The input on line 110 is the $V_R$ output of a selected one of the digital phase lock loops. This is a pulse train of the 10.2 kHz frequency in the exemplary embodiment that is provided on line 110 of FIG. 5 at the output of the $V_R$ frequency divider 98. The commutator cycle advance signal is applied to this divider via an input on line 156 to the clear input logic of one of the divider flip flops 159.

An output from the Q terminal of the final flip flop 160 of the divide by 51 circuit is fed to toggle each of the three flip flops of the divide by 5 circuit 146. The output of the latter is fed via a lead 162 as the toggle input to the first flip flop 164 of the intermediate divider circuit 154. The output of the second flip flop 166 of this divider 154, which flip flop is toggled from the output of flip flop 64, is fed to toggle the first flip flop of the series of three interconnected flip flops that provide the timing interval of the start interval circuit 58. The outputs of the three flip flops of timing circuit 58 are combined in a three input coincidence circuit 168 which provides a signal at the end of the predetermined interval (725 milliseconds in the exemplary embodiment).

The output of the divide by 5 circuit 146 on line 162 is also fed as a toggle input to the flip flops of the second divide by 5 circuit 148 which provides an output on line 170 to toggle the flip flops of the third divide by 5 circuit 150. The output of the latter is fed to toggle the final divide by 2 flip flop 152 (FIG. 10c). The latter provides on its Q and $\overline{Q}$ output lines 170 and 171, the 0.8 Hz commutator triggering signal. The output on line 170 is fed to a transistor driver 172 that provides at its collector, on line 173, a toggle input to all of the flip flops 174, 175, 176, 177, 178, 179, 180 and 181, of shift register 54. The flip flops of the shift register are conventionally interconnected to provide for recycling of a unique stage condition wherein each stage copies a bit in a preceding stage when all are toggled.

The 0.8 Hz signal on line 171 is fed as a first input to a gate 182 which receives on line 183 a second input from the common terminal of the switch $S_2$ (see FIG. 3). Gate 182 is the station 2 coincidence gate labeled 68 in FIG. 3.

The 0.8 Hz signal on line 171 at the output of flip flop 152 is also fed as a first input to the station 1 gate 184 which receives a second input on line 185 from the common terminal of the station switch $S_1$. Gate 184 is equivalent to the station 1 gate 66 of FIG. 3, wherefore at the outputs of gates 182 and 184 appear two of the station gating signals that are fed to enable two of the digital phase lock loops.

At the Q output of flip flop 164 of the intermediate divider 154, on line 104, appears the up/down counter timing signal, the 50 ms signal in the described exemplary embodiment. The signal on line 104 is fed with mutually opposite polarities to the set and clear input logic of flip flop 112 of the rate sync circuit of FIG. 8.

The on/off driver 56 of FIG. 3 comprises a transistor 190 (FIG. 10b) that has its collector connected via line 192 to all of the clear ($C_D$) inputs of flip flops of shift register 54, divider 152, divider 150, divider 148, start interval generator 58, divider 154 and divider 146. It is found that the flip flops of divider 144 need not be cleared since the frequency of these is too high to be of significance.

A Manual input on line 194, which is derived from the common terminal of switch $S_M$ of FIG. 3 is inverted in a gate 195 and fed to the base of the driving transistor 190. The Manual input is also fed to the clear input terminal of a flip flop 196 that forms the start latch circuit indicated at 62 in FIG. 3. The start latch flip flop 196 has a latching circuit connecting its Q output through a gate 192 that operates to provide an OR function and has an output fed to the clear input logic and, via an inverter 199, to the set input logic of FF196. Accordingly, whenever the flip flop 196 is set, it remains in set condition until it is cleared by an input to its $C_D$ terminal. The Q output of flip flop 196 is also fed via a gate 200 that provides an OR function and thence through an inverter 201 to the base of the driving transistor 190. Thus, when set, the latching flip flop 196 maintains the driving transistor in a state to keep the starting circuit and station commutator circuits running.

The output of the start interval timer 58, at the output of coincidence gate 168, is fed as the second input to gate 198, whereby the start latch flip flop may be conditioned to be set when the interval timer times out and the next toggle input to flip flop 196 occurs. The toggle input to the latching flip flop 196 is provided at the output of divide by 5 circuit 146, which output in the illustrated embodiment is a signal of having a period of 25 milliseconds. This 25 millisecond signal on line 202 is also fed to toggle the first flip flop of the next divide by 5 divider 148. It is on this line 202 that a retard signal is fed via a retard input line 203 to temporarily inhibit the dividing operation.

An exemplary amplitude threshold circuit, corresponding to circuit 60 of FIG. 3, is illustrated in the box 204 of FIG. 10b, and has an input on line 205 in the form of the received RF station signals. The threshold circuit includes a differential amplifier 206 and a circuit 208 that provides an input to the amplifier 206 in the form of the amplitude envelope of the input RF signal. The threshold circuit is energized by a signal on input line 210 that is received from the common terminal of switch $S_A$ (FIG. 3) whereby an output from the amplifier is fed via line 211 as the second input to the gate 200 when switch $S_A$ is in "automatic" position.

The several flip flops of the shift register 54 are each toggled by the output of transistor 172. The latter receives an output from a gate 212 which provides an OR function and has a first input from FF152. A second input to the gate 212 is derived from a differentiator comprising a capacitor 213 and a resistor 214 having an input via line 215 from the Q output of the latching flip flop 196. Accordingly, when the latching flip flop is toggled to its set condition, the differentiator 213, 214 provides an input to the base of transistor 172 via gate 212 to thereby furnish a signal on line 173 to toggle all of the flip flops of the shift register.

The signal on line 215 from the latching flip flop is also fed to a second differentiating circuit comprising a capacitor 216 and a resistor 217. The output of this differentiator is inverted in gate 218 and fed via lead 185 through the common terminal of the $S_1$ switch to a selected one of the commutator outputs indicated at A through H. The commutator output terminals are coupled to the respective leads interconnecting the $\overline{Q}$ outputs of each flip flop to the clear input logic terminal of the next flip flop of the shift register. When the start flip flop 196 is set, all of the shift register flip flops are toggled via the differentiating circuit 213, 214. In addition, via the switch $S_1$, a clear logic input to a ferent ways other than those illustrated in FIG. 2 and specific details of such use and display form no part of the present invention.

Modified Phase Loop Rate Synchronization

Illustrated in FIG. 13 is a block diagram of a digital phase lock loop having an alternate form of rate synchronization. In this arrangement, trigger circuit 92, up/down counter 86, $V_R$ frequency divider 98, phase demodulator 82 and integrator 94 are all connected and arranged just the same as the corresponding components of the phase lock loop shown in FIG. 5. In this arrangement, however, rate synchronization is provided by a pair of decoders 100a and 100b, together with a coincidence circuit 300. Gates corresponding to those enabled by the station gate, namely, gates 106 and 96 and 108 of FIG. 5, may also be employed in the phase lock loop of FIG. 13, but are not shown in this drawing.

Rate synchronization in the arrangement of FIG. 13, is provided by the use of two decoders, each of which receives all four components of the four reference phase component generator, and each of which is set to select a single one of the components by outputs provided from the counter. Although the two decoders are identical and receive identical inputs in the form of reference phase components and the outputs of the up/down counter, the outputs of the latter are connected to the decoders so that when decoder 100a has selected a component of one phase, such as 0°, for example, the decoder 100b will be selecting the next successive phase, the 90° component. The decoder 100a operates exactly as does the decoder 100 of the FIG. 5 arrangement and cooperates with the up/down counter to sequentially select reference phase components in one sequence or another according to the direction of the counter as controlled by the trigger circuit 92. The output of decoder 100b which at all times is a component of different phase (the next successive component) than the component which comprises the output of decoder 100a, is employed to provide one input to the coincidence circuit 300. The second input to the coincidence circuit 300 is the counting interval or counting rate input provided by the 50 millisecond timing signal on line 104 from the station frequency divider. The circuit 300 may be a flip flop of the type described above having logic inputs (of mutually opposite sense) from the timing signal on line 104 and having a toggle input from the decoder 100b.

Accordingly, when a phase lock loop is tracking a reference component of a given phase, the up/down counter will be caused to shift to its next count, whether counting up or down, at the end of the 50 millisecond interval but in coincidence with the fall of the next pulse of the next component. Such next pulse immediately follows the end of the 50 millisecond interval and is selected from the pulse train that is to be chosen by the counter 86 decoder 100a combination in the next state of the counter. Thuse, use of the second decoder 100b together with the coincidence circuit 300 takes the place of the rate synchronization circuit 102 of FIG. 5, performing an equivalent synchronizing and delaying function.

Multi-plexed Phase Lock Loops

As previously indicated, each phase lock loop is substantially identical to every other, but is activated at a unique time that corresponds to a station assigned to the particular tracking loop by the commutator. Where three or more lines of position are desired, requiring three or more pairs of phase lock loops, it may be more economical to multiplex (time share) a single loop, rather than build many. Accordingly, for such a multiplexing arrangement a single counter and a single phase demodulator may be employed for all six or more phase loops. Each individual loop will have its own decoder, divider and rate synchronization circuit. All phase lock loop components are connected and function just as previously described except that the connections between the common parts (counter and demodulator) and the duplicated parts (decoder, divider, rate sync) are made in sequence under control of the commutator station gate pulses. Such an arrangement is shown in FIG. 14.

Figure 14:
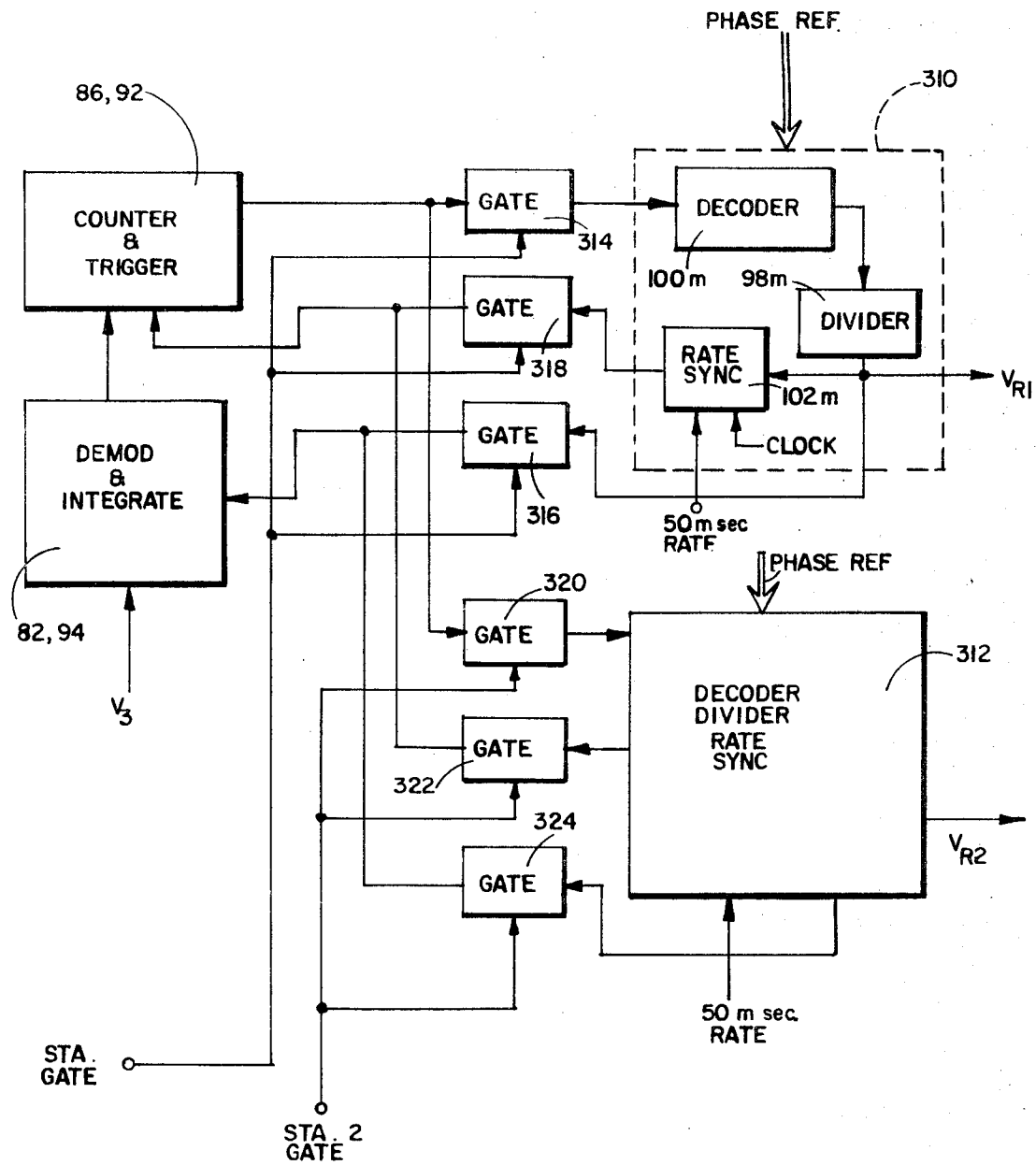
FIG. 14 is a block diagram of an arrangement for phase lock loop time sharing.

Illustrated in FIG. 14 is a simplified arrangement for time sharing of a single pair of phase lock loops of the type described herein. A counter and trigger circuit 86, 92 and a demodulator and integrator circuit 82, 94, constituting the like-numbered components of FIG. 5, are employed in common for a pair of loops, each of which includes a group of unique components indicated by boxes 310, 312. Although only two time sharing loops are illustrated, the described arrangement is obviously useful and preferred for more than two loops, requiring only duplication of the unique components and input/outgates for each added loop. The components in each of the boxes 310, 312 are identical and only one group is shown. These comprise a decoder 100m, a $V_R$ frequency divider 98m and a rate synchronizing circuit 102m, all interconnected to each other and functioning just as do the analogous components, decoder 100, divider 98 and rate synchronizing circuit 102, of FIG. 5.

The second phase tracking loop 312 comprises a similar group of components, namely, a decoder, divider and rate synchronizing circuit, also connected as previously described. The inputs and outputs of the phase tracking loop unique component 310 and 312 are time shared with the common components 86, 92, 82, 94 by means of a plurality of gates that are enabled from the station commutator station gates. For example, for the first of the two multiplexed phase lock loops shown in FIG. 14, the input to decoder 100m from the counter/trigger 86, 92 is passed through a gate 314 and the output of divider 98m and the output of rate synchronizing circuit 102m are passed through gates 316 and 318, respectively, to the demodulator 82 and the counter 86, respectively. All of the gates 314, 316 and 318 are enabled simultaneously for the "ON" time of phase lock loop 310, as by the station 1 gate, for example. Similarly, all of gates 320, 322 and 324 which selectively connect inputs and outputs of the unique phase lock loop group 312 to the common counter/trigger and demodulator/integrator circuits are simultaneously enabled during at least a part of the transmission from the station assigned to this particular loop. This gating of the second loop may be achieved by the station 2 gate signal provided by the commutator, for example. Accordingly, although the counter/trigger and demodulator/integrator circuits are employed during tracking of each station and during the operation of all phase lock loops, the decoder, divider and rate synchronizing components unique to each loop are activated (e.g., connected in the complete tracking loop) only during the transmission of the station assigned to the particular loop. Nevertheless, even when not actiunique one of the flip flops (selected by the position switch $S_1$) is kept false whereby the two false inputs to set and clear input logics of such unique flip flop allow the selected flip flop to be toggled and uniquely placed in set condition.

The outputs from the several shift register at terminals labeled A through H, inclusive, are fed via the station selector switch ($S_1$ for example) and thence through the selector switch common line 185 as a second input to gate 184 which corresponds to the station 1 gate 66 of FIG. 3. There is one complete set of shift register terminals for each phase lock loop, all sets connected in parallel, but only one such set is shown for clarity of the drawings. Similarly, an output of the shift register selected by a second switch $S_2$ is fed via the common line 183 as the second input to gate 182 that corresponds to station gate 68 of FIG. 3. As previously indicated. the other inputs to each of these coincidence gates is the 0.8 mHz signal (a signal of 625 ms half cycle duration) that is derived from the final divide by 2 flip flop 152.

Phase Lock Loop Circuit

Figure 11B:
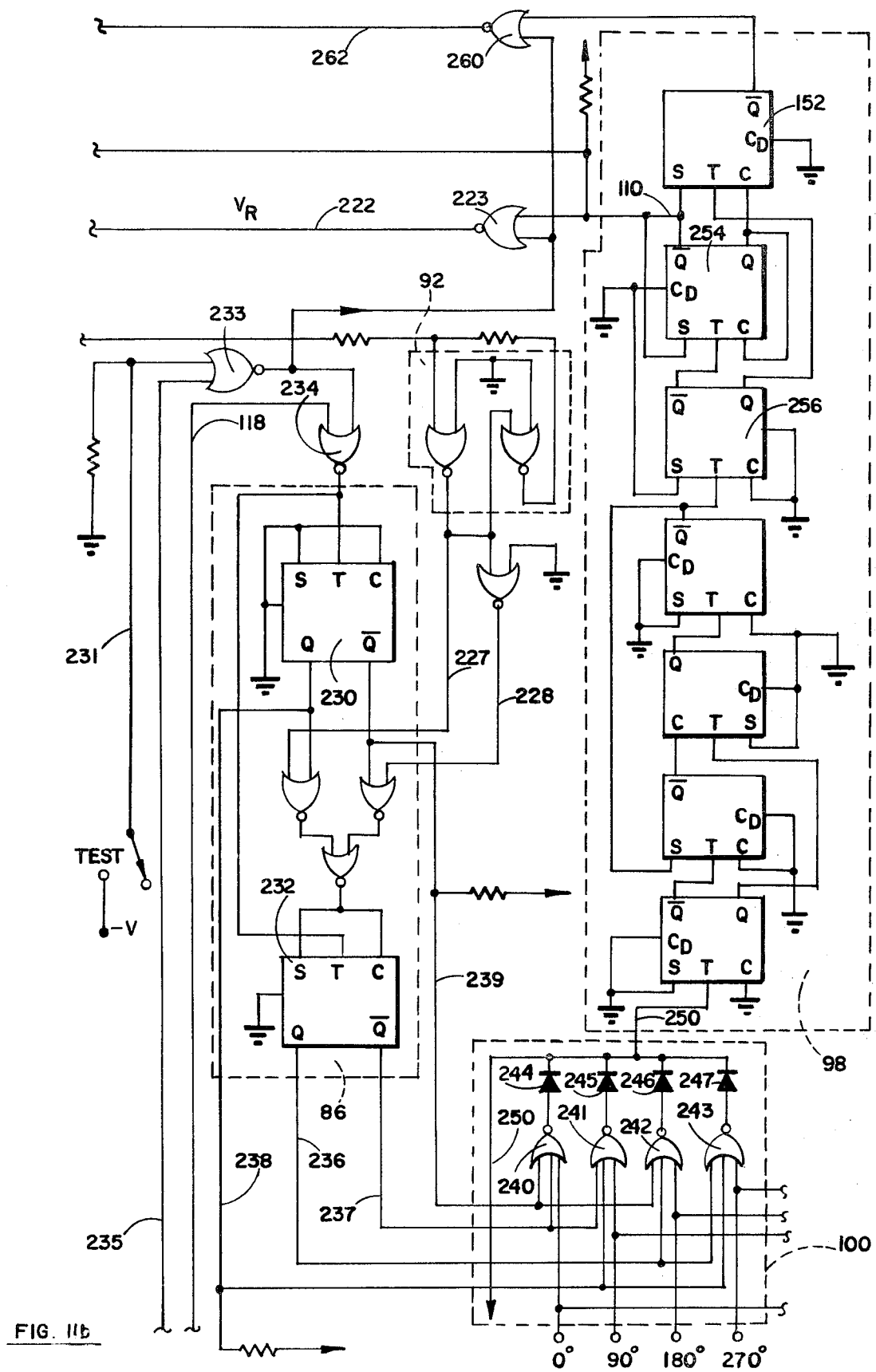

Illustrated in FIGS. 11a and 11b is circuitry of one of the digital phase lock loops. It will be understood that each of the other digital phase lock loops is identical to that which is illustrated and all receive the four common reference phase components. FIGS. 11a and 11b form a single circuit diagram when placed side by side with FIG. 11a on the left.

The phase demodulator 82 receives the RF station signal input (from amplifier 20 of FIG. 2) on a line 220 via a capacitor 221 and compares this with the output on line 222 of a gate 223 which is analagous to the coincidence gate 96 of FIG. 5. The conventional demodulator 82 embodies a field effect transistor 83 that is turned on and off by the $V_R$ signal on line 222 so as to pass or not pass the incoming RF signal on line 220. When the two inputs to the demodulator are in phase quadrature, its output averages substantially zero. The output has one polarity or the other according to whether one of its inputs leads or lags relative to the quadrature relation.

The output of demodulator 82 is fed as a first input to an integrating amplifier 224 and thence, via a transistor 225, to the input of a Schmitt trigger 92. the Schmitt trigger provides direction control output via lines 227, 228 to control the direction of counting of a two stage up/down counter comprised of flip flops 230, 232. The counting input to the up/down counter 230, 232 is provided via a coincidence command gate 234 that receives a first input on line 118 from the flip flop 114 of the rate synchronization circuit shown in FIG. 8. The second input to the coincidence gate 234 is derived on line 235 via a gate 233 from the output of the station gate such as gate 184 of FIG. 10c that corresponds to the particular phase tracking loop.

Outputs of the flip flops 230, 232 of the up/down counter on lines 236, 237, 238, 239 are fed as illustrated to respective ones of three input coincidence gates 240, 241, 242 and 243 of decoder 100. The gates 240 through 243, inclusive, respectively receive the reference phase pulse trains 0°, 90°, 180°, 270°, which pulse trains are also fed to decoders of each of the other phase tracking loops. The outputs of the decoder coincidence gates are fed through a four input OR circuit comprising diodes 244, 245, 246 and 247, to provide on decoder output line 250 that one of the four reference phase pulse trains that is selected by the particular count or condition of the up/down counter 86 at any given instant.

The output of decoder 100 on line 250 also is fed to toggle flip flop 112 of the rate synchronization circuit of FIG. 8 and is also fed to toggle the first of a chain of seven flip flops, interconnected to provide the divide by 40 divider 98 employed in each phase lock loop of the exemplary embodiment. In the exemplary embodiment, the last two flip flops of the divider 98, flip flops 252, 254, provide the same frequency output, although in phase quadrature, both being toggled by the preceding flip flop 256. A first ungated output from the flip flop 254 of divider 98 appears at its $\overline{Q}$ output on line 110 and is fed as to toggle the first flip flop of the divide by 51 circuit 144 of FIG. 10a. The signal on line 110, which is the signal $V_R$ for the particular digital phase tracking loop, is also fed through the coincidence gate 223, when the latter is enabled by the station gate signal on line 235, and thence, via line 222, to one of the inputs of demodulator 82 which provides its minimum output when the signal on line 222 is in phase quadrature with the signal on line 220. A second output of divider 98 is provided by the flip flop 252 and is fed via a coincidence gate 260 which is enabled by station gate signal on line 235 to provide a gated output on line 262. The gated output on line 262 is in phase with the incoming station signal and may be used to display receipt of such station signal by means of conventional circuitry (not shown).

A second input to gate 233 provides for system test, allowing the frequency of the crystal controlled oscillator 28 (FIG. 2) to be compared to the Omega transmission frequency. A low "test" signal on line 231 which provides a second input to gate 233 will disable counting input gate 234 and prevent this one loop from tracking. Accordingly, its output (line 110) follows the reference phase component selected by the now fixed count of the counter. This output may then be compared (in one of the comparators of FIG. 2) with the output of a phase lock loop that is allowed to track the Omega transmission, to thereby indicate drift of the system oscillator.

Figure 12:
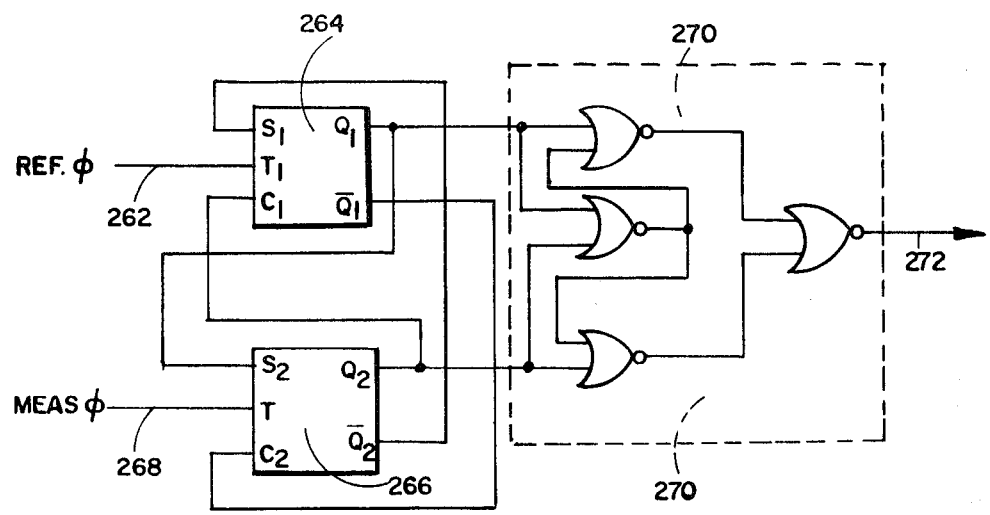
FIG. 12 illustrates details of a typical comparator.

The output of flip flop 254 on line 110 is also fed as one of the inputs to an appropriate one of the phase comparators 36, 38 of FIG. 2. As illustrated in FIG. 12 and described in further detail in the application (now abandoned) of R. L. Wood for Non-Ambiguous Phase Comparator, identified above, an exemplary phase comparator for use in the described system comprises a pair of flip flops 264, 266 interconnected as shown in FIG. 12 and receiving toggle inputs on lines 262, 268, respectively. The toggle input on line 262 is the $V_R$ output from the divider 98 of a first one of the digital phase tracking loops and the toggle input on line 268 is the $V_R$ output from the corresponding divider of a second one of the digital phase tracking loops. The outputs of the flip flops 264, 266 are fed to an exclusive OR circuit 270 to provide on output line 272 a signal having a width proportional to the phase angle by which the signal on one of the lines 262, 268 leads the signal on the other. Accordingly, the desired phase difference between selected station signals is indicated by the signal on line 272, is displayed as desired and used for entry into the Omega station tables identified above. It will be appreciated that the phase difference signal on line 272 may be displayed and employed in many difvated (gates 314-324 are normally disabled so as to pass no signal therethrough), each unique component group 310, 312, etc., is receiving all the reference phase components and its decoder is selecting a given one of the components so that an output $V_{R1}$ or $V_{R2}$ will be continuously provided.

There has been described apparatus and methods for determining position by phase comparison of selected pairs of remotely transmitted signals and employing new and improved arrangements for starting and synchronization of a station commutator together with phase tracking loops of simplified circuitry and greatly increased stability and reliability.

The foregoing detailed description is to be clearly understood as given by way of illustration and example only, the spirit and scope of this invention being limited solely by the appended claims.

What is claimed is:

1. A navigation receiver for use with a group of mutually spaced stations that transmit station signals in sequence from one station after another, each sequence of station signal transmissions being repetitive at a group repetition rate, said receiver comprising
   means for receiving said station signals,
   a commutator comprising a recycling multi-stage shift register,
   means for synchronizing the commutator with the sequence of signal transmissions from said group of stations,
   first and second phase reproducing means each responsive to an input signal thereto of relatively short duration for generating a continuous output signal having a fixed phase relative to the phase of the input signal thereto,
   means for feeding said received station signals as individual input signals to respective ones of said first and second phase reproducing means,
   means responsive to said shift register for selectively activating individual ones of said phase reproducing means in synchronism with sequence of signal transmissions for selected ones of said stations,
   comparator means for comparing output signals of said first and second phase reproducing means, and
   means responsive to said comparator means for indicating phase difference of said selected received station signals.

2. The receiver of claim 1 including reference generator means for generating a common reference signal having a plurality of components of mutually different phase, and wherein each of said phase reproducing means comprises
   a reversible counter for storing a number counter thereby and for counting in one direction or another in accordance with a direction control input applied thereto,
   a decoder responsive to the counter and to said reference generator means for selecting one of said reference signal components in accordance with the number stored in said counter,
   a phase demodulator responsive to a selected one of the received station signals and to a divided output of said decoder for generating a phase difference signal representative of the phase difference of the input signals to the phase demodulator, means responsive to said phase difference signal for providing said direction control input to said counter, and means synchronized with said reference generator means for providing counting inputs to the counter.

3. The receiver of claim 1 wherein said comparator means includes means for producing a signal indicative of the magnitude of a predetermined sense of the phase difference between output signals of said first and second phase reproducing means.

4. The navigation receiver of claim 1 wherein said commutator includes means for generating a start signal, means responsive to said start signal for placing in a unique state a single one of said shift register stages that corresponds to a preselected one of said stations.

5. The navigation receiver of claim 1 wherein said means for synchronizing the commutator comprises threshold means for generating a threshold signal when the amplitude of the received station signal exceeds a preselected threshold, and timing means for starting said commutator when said threshold signal occurs for a preselected interval.

6. The receiver of claim 5 wherein said means for starting said commutator comprises means responsive to said timing means for establishing a unique state of a single one of the stages of said shift register.

7. The navigation receiver of claim 1 wherein said commutator comprises a multi-terminal switch having a plurality of input terminals each connected with a respectively individual one of the stages of the shift register and having a common output terminal, said means for synchronizing the commutator comprising means for generating a toggle signal, means for applying the toggle signal to the commutator to achieve cycling thereof, start circuit means for generating a start signal in response to a first input thereto, start interval generator means for initiating a start interval in response to an output from said start circuit means, latching circuit means responsive to said start interval generator means for producing a latch signal, means for applying said latch signal to hold said start circuit means in start condition, and commutator conditioning means responsive to the output of said start interval generator means for establishing a unique state of a preselected one of said shift register stages.

8. The receiver of claim 7 wherein said commutator conditioning means comprises means responsive to the termination of the interval determined by said start interval generator means for providing a toggle signal to all of the stages of said shift register and for simultaneously providing a unique stage signal to the common terminal of said switch, whereby a unique stage signal is fed via said switch to a selected stage of said shift register.

9. The receiver of claim 7 including threshold circuit means responsive to said means for receiving station signals, for generating a threshold signal when a received station signal exceeds a predetermined amplitude, and means for feeding said threshold signal to the first input of said start circuit means.

10. The receiver of claim 7 including coincidence means having a first input from said common output terminal and having a second input from the shift register toggle signal, and means responsive to the output of said coincidence means for activating said first phase reproducing means.

11. The navigation receiver of claim 10 including a second multi-terminal switch having a common output terminal and having a plurality of input terminals each individually connected to a respective one of the stages of the shift register, a second coincidence means having a first input from said common terminal of said second switch, having a second input from said shift register toggle signal and having an output, and means responsive to the output of said second coincidence means for activating said second phase reproducing means.

12. A phase tracking and phase comparison receiver for use with a repetitive group of sequentially transmitted station signals, each signal being uniquely transmitted by a respective one of a group of mutually spaced stations, said receiver comprising, means for receiving transmitted station signals, a plurality of digital phase tracking means responsive to an input signal for generating pulse train outputs each having a predetermined fixed phase relative to the phase of an input signal, said plurality of digital phase tracking means comprising means for generating a common reference signal having a plurality of component pulse trains of mutually different phases, and a plurality of tracking loops each including digital means for selecting one of said component pulse trains as the loop pulse train output, means for feeding signals received by said means for receiving as input signals to selected individual ones of said tracking loops respectively, and comparison means responsive to a pair of said tracking loops for generating a phase signal indicative of the phase difference of input signals to the tracking loops of said pair.

13. A navigation receiver for use with a group of mutually spaced stations that transmit station signals in sequence from one station after another, each sequence of station signal transmissions being repetitive at a group repetition rate, said receiver comprising:

means for receiving said station signals, a commutator, means for synchronizing the commutator with the sequence of signal transmissions from said group of stations, a plurality of phase tracking systems each phase tracking system including means for generating a reference phase signal having a plurality of components of mutually different phases, and a tracking loop comprising:

phase selecting means for selecting said components in a first sequence of one sense or in a second sequence of opposite sense, demodulator means for comparing the phase of a selected one of said reference components with the phase of an input signal, means responsive to said demodulator means for controlling the sense of said sequential selection of reference components, and means responsive to the selected component for providing a system output signal, said plurality of systems comprising a number of said tracking loops, a plurality of said loops being responsive in common to a single one of said means for generating a reference phase signal, means responsive to said commutator for feeding selected ones of said received station signals as individual input signals to respective ones of said phase tracking systems, comparator means for comparing output signals of at least one pair of said tracking loops, and means responsive to said comparator means for indicating phase difference of selected received station signals.

14. The navigation receiver of claim 13 wherein:

said phase selecting means for selecting said reference components in said first and second sequences comprises decoder means having said reference components as a first set of inputs thereto and reversible counter means for providing a second set of inputs to said decoder means, and said means for selecting one sense or the other of said sequence of said selected reference components comprises means responsive to said demodulator means for controlling the counting direction of said counter.

15. The navigation receiver of claim 14 further including:

means for providing a counting input to said counter, and means for synchronizing said counting input with said reference components, and wherein said means for synchronizing said counting input includes means for controlling the counting rate to a rate that is lower than the rate of any one of said reference components and said means for controlling direction of said reversible counter comprises an integrator responsive to said demodulator means, and a counter direction controlling trigger responsive to said integrator, said integrator having a time constant that is not greater than the period of the counting rate of said counter.

16. A receiver for use with a plurality of remotely located stations that transmit station signals in in sequence from one station after another, said receiver comprising:

a plurality of phase tracking circuits, means for feeding a received plurality of station signals to said phase tracking circuits, said phase tracking circuits respectively developing first signals indicative of the respective phases of associated received station signals, a plurality of phase comparison means, each of said phase comparison means being responsive to the first signals from an associated pair of said phase tracking circuits for generating an output indicative of the phase comparison between the first signals applied thereto, means for indicating the outputs of said phase comparison means, commutator means for sequentially enabling said phase tracking circuits to respectively respond to the plurality of received signals to develop the first signals, and starting means for said commutator means, said starting means comprising:

driver circuit means for enabling said commutator means, threshold means responsive to received station signals for actuating the driver circuit means in response to a received station signal having a preselected amplitude, and means for maintaining said driver circuit means in actuated condition in response to receipt of a station signal having a predetermined minimum amplitude for a predetermined minimum duration.

17. A receiver for handling selected signals of a group of individually unique signals transmitted in a known sequence, said receiver comrising means for receiving said signals, means for generating a common reference signal having a plurality of components of mutually different phases, a plurality of phase tracking circuits, each responsive to said common reference signals, each including means for tracking the phase of a signal input thereto, and each having an output, each said phase tracking circuit comprising means for sequentially comparing a signal input to the individual phase tracking circuit with said reference signal components in a first sequence of such components, means responsive to said receiving means for feeding said received signals as an input to each of said tracking circuits, commutator means for generating a plurality of enabling signals, means for synchronizing the commutator means enabling signals with the sequence of said transmitted signals, said synchronizing means including means for ensuring time coincidence of each of said enabling signals with at least a portion of a uniquely corresponding signal of said group of transmitted signals, means for applying selected ones of said enabling signals to respective ones of said circuits, and means for comparing phase of outputs of selected pairs of said circuits.

18. A receiver for handling selected signals of a group of individually unique station signals transmitted in a known sequence, said receiver comprising:

an amplifier for receiving station signals, a station commutator responsive to said amplifier having a timing input and having a plurality of sequential gating outputs, a common reference phase generator for providing a plurality of reference signal components of mutually different phase, a plurality of digital phase lock loops each having a first input from the output of said amplifier, a second input from a respectively individual one of said station commutator gating outputs, and a group of reference inputs from the respective reference signal components of said common reference phase generator, a plurality of phase comparators each having a pair of inputs from loops of respectively unique pair of said digital phase lock loops, and output means responsive to said comparators for providing an indication of the phase difference of the respective inputs to said comparators.

19. The receiver of claim 18 wherein each of at least a group of said digital phase lock loops comprises:

a reversible counter having a counting input, a direction control input, and a plurality of outputs, a decoder having a first group of inputs connected to the counter outputs, having a second group of inputs connected to receive components of said reference signal and having as an output one of said reference components selected by the state of said counter, a frequency divider having an input from said decoder output and having an output, a phase demodulator having a first input from said output of said frequency divider, a second input from the output of said amplifier, and having an output, an integrator having an input from the output of said phase demodulator and having an output, a trigger circuit having an input from the output of said integrator and having an output connected to the direction control input of said counter, a rate synchronization circuit having a synchronizing input from said decoder output, a counting rate input, and having an output connected to the counting input of said counter.

20. The receiver of claim 19 including a station commutator frequency divider having an input from the output of one of said digital phase lock loop frequency dividers and having a frist output connected to the timing input of said commutator, said station commutator frequency divider having a second output connected to the counting rate input of said rate synchronization circuit.

21. The receiver of claim 20 wherein said common reference phase generator means includes a clock signal generator having an output, and wherein said rate synchronization circuit comprises a counting control flip flop having said synchronizing and counting rate inputs, and a second flip flop having an enabling input from an output of said first flip flop, having a toggling input from said clock signal generator output and having an output connected to the counting input of said counter.

* * * * *